US008644757B2

(12) United States Patent
Curcio et al.

(10) Patent No.: US 8,644,757 B2
(45) Date of Patent: Feb. 4, 2014

(54) METHOD AND SYSTEM FOR CREATION AND CONTROL OF VIRTUAL RENDERING DEVICES

(75) Inventors: Igor Danilo Curcio, Tampere (FI); Sujeet Mate, Tampere (FI); Ye-Kui Wang, Tampere (FI); Jörg Ott, Espoo (FI); Jegadish Devadoss, Espoo (FI); Varun Singh, Espoo (FI); Juha Tapani Purho, Helsinki (FI)

(73) Assignee: Nokia Corporation (FI)

( * ) Notice: Subject to any disclaimer, the term of this patent is extended or adjusted under 35 U.S.C. 154(b) by 1107 days.

(21) Appl. No.: 12/328,558

(22) Filed: Dec. 4, 2008

(65) Prior Publication Data

US 2010/0144283 A1 Jun. 10, 2010

(51) Int. Cl.
*G09G 5/00* (2006.01)
*H04H 40/00* (2008.01)

(52) U.S. Cl.
USPC .......... 455/3.06; 345/156; 345/157; 345/158; 345/173; 345/174; 345/175; 345/176; 345/177; 345/178; 345/179

(58) Field of Classification Search
USPC ................... 345/156–158, 173–179
See application file for complete search history.

(56) References Cited

U.S. PATENT DOCUMENTS

| 4,866,530 | A | | 9/1989 | Kalua | |
|---|---|---|---|---|---|
| 5,828,410 | A | * | 10/1998 | Drapeau | 348/383 |
| 5,923,307 | A | * | 7/1999 | Hogle, IV | 345/4 |
| 7,242,369 | B2 | * | 7/2007 | Huang | 345/1.1 |
| 7,284,046 | B1 | | 10/2007 | Kreiner et al. | |
| 7,525,511 | B2 | * | 4/2009 | Baudisch | 345/1.3 |
| 7,532,196 | B2 | * | 5/2009 | Hinckley | 345/156 |
| 7,847,754 | B2 | * | 12/2010 | Nishiyama et al. | 345/1.1 |
| 7,948,450 | B2 | * | 5/2011 | Kay et al. | 345/1.3 |
| 8,265,707 | B2 | * | 9/2012 | Carmichael et al. | 455/566 |

(Continued)

FOREIGN PATENT DOCUMENTS

| EP | 1 508 851 A1 | 8/2003 |
|---|---|---|
| GB | 2 274 225 A | 7/1994 |

(Continued)

OTHER PUBLICATIONS

William A. S. Buxton, "Telepresence: Integrating Shared Task and Person Spaces", Computer Systems Research Institute, Proceedings of Graphics Interface '92, 1992, http://www.dgp.toronto.edu/OTP/papers/bill.buxton/shared_space.html, 11 pages.

*Primary Examiner* — Bobbak Safaipour
(74) *Attorney, Agent, or Firm* — Banner & Witcoff, Ltd.

(57) ABSTRACT

Methods and systems for coordinating user terminals are disclosed. A user terminal may receive a user terminal identifier and a sensor identifier from a user terminal, determine a group topology based on the user terminal identifier and the sensor identifier to identify a spatial relationship relative to the user terminal, receive a media signal, and identify a subsection of the media signal. The user terminal also may generate subsection information to assign a subsection of the media signal to the user terminal corresponding to the spatial relationship, and may communicate the subsection information to the user terminal.

28 Claims, 15 Drawing Sheets

(56) References Cited

U.S. PATENT DOCUMENTS

| | | |
|---|---|---|
| 2003/0210209 A1 | 11/2003 | Lagarrigue et al. |
| 2006/0033712 A1 | 2/2006 | Baudisch et al. |
| 2007/0064124 A1 | 3/2007 | Kirani et al. |
| 2007/0192452 A1 | 8/2007 | Song et al. |
| 2008/0216125 A1 | 9/2008 | Li et al. |
| 2010/0121921 A1* | 5/2010 | Dunton ................. 709/205 |

FOREIGN PATENT DOCUMENTS

| | | |
|---|---|---|
| GB | 2 425 230 A | 10/2006 |
| WO | 94/17637 A1 | 8/1994 |
| WO | 02/063416 A2 | 8/2002 |
| WO | 2007/143297 A2 | 12/2007 |

* cited by examiner

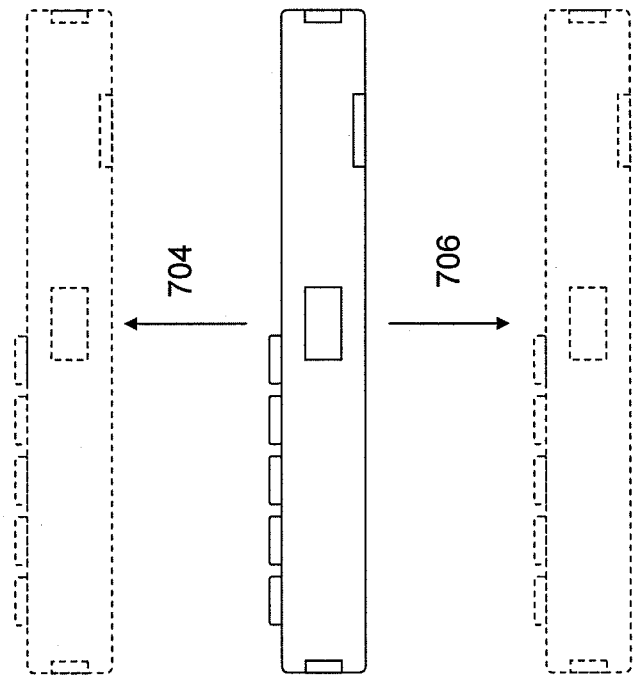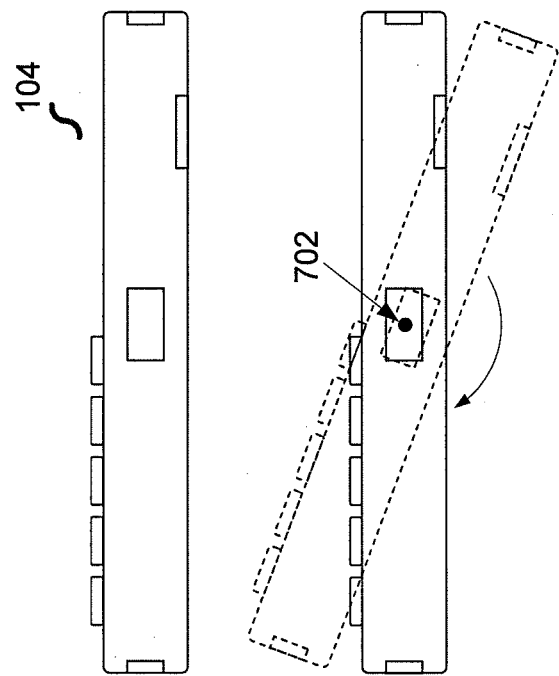
Figure 7

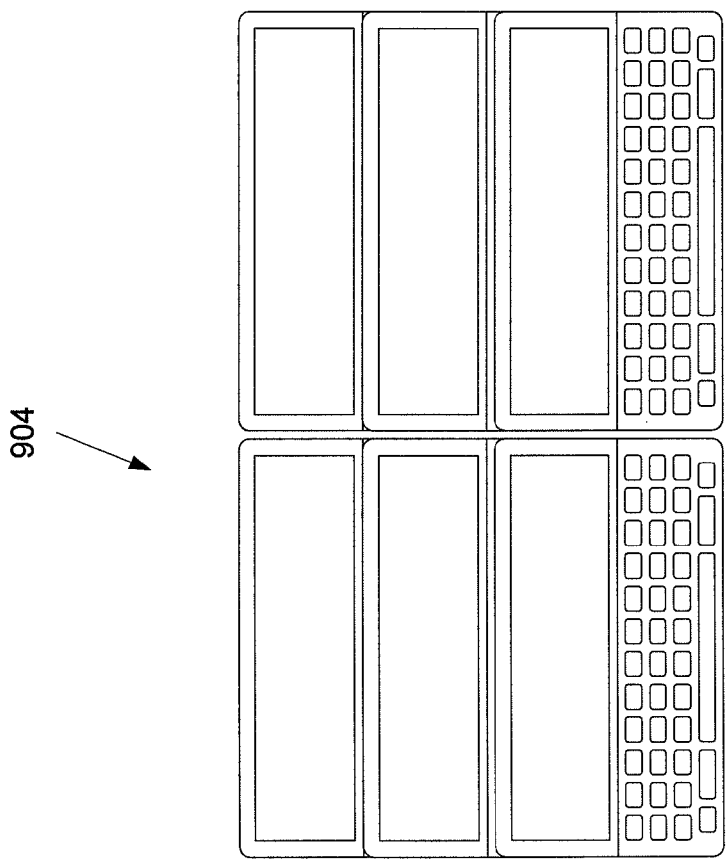
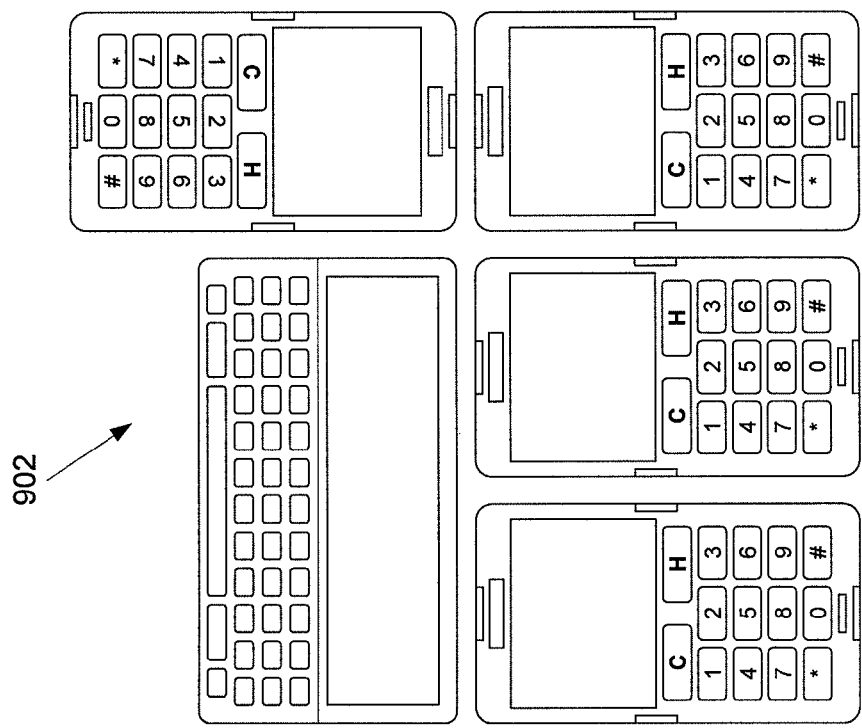
Figure 9

METHOD AND SYSTEM FOR CREATION AND CONTROL OF VIRTUAL RENDERING DEVICES

FIELD

Example embodiments of the invention generally relate to rendering media such as image, video, graphics, as well as speech and audio. More specifically, example embodiments of the invention relate to coordination of rendering user terminals to display a mosaic of visual media and/or for playback of multi-channel audible media.

BACKGROUND

Mobile media consumption—such as mobile TV, variants of (on-demand) media streaming—is gaining popularity. While the available bit rate of wireless networks for mobile users is increasing, video compression is improving, and capabilities of mobile devices are expanding, there is one limiting factor inherent to the very nature of mobile devices: their form factor limits the available display area and thus the perceived fidelity of the presented visual media. Similarly, the form factor limits the available audio effects to plain stereo (typically) using headphones.

BRIEF SUMMARY

The following presents a simplified summary of some example embodiments of the present disclosure in order to provide a basic understanding of some example embodiments of the invention. This summary is not an extensive overview, and is not intended to identify key or critical elements or to delineate the scope of the claims. The following summary merely presents some concepts and example embodiments in a simplified form as a prelude to the more detailed description provided below.

Some example embodiments of the present disclosure are directed to an apparatus, method and system for coordinating multiple user terminals to render a mosaic of an image.

More specifically, methods, apparatus, and systems in accordance with some example embodiments of the present disclosure provide for receiving a user terminal identifier and a sensor identifier from a user terminal, determining a group topology based on the user terminal identifier and the sensor identifier to identify a spatial relationship relative to the user terminal, receiving a media signal, and identifying subsections of the media signal. The user terminal also may generate subsection information to assign a subsection of the media signal to the user terminal corresponding to the spatial relationship, and may communicate the subsection information to the user terminal.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 7 illustrates operation of a motion and orientation sensor of a user terminal in accordance with example embodiments of the present disclosure.

FIG. 9 illustrates example topologies of user terminals in accordance with example embodiments of the present disclosure.

DETAILED DESCRIPTION

In the following description of the various embodiments, reference is made to the accompanying drawings, which form a part hereof, and in which is shown by way of illustration various embodiments in which one or more example embodiments of the invention may be practiced. It is to be understood that other embodiments may be utilized and structural and functional modifications may be made without departing from the scope of the present invention.

Figure 1:
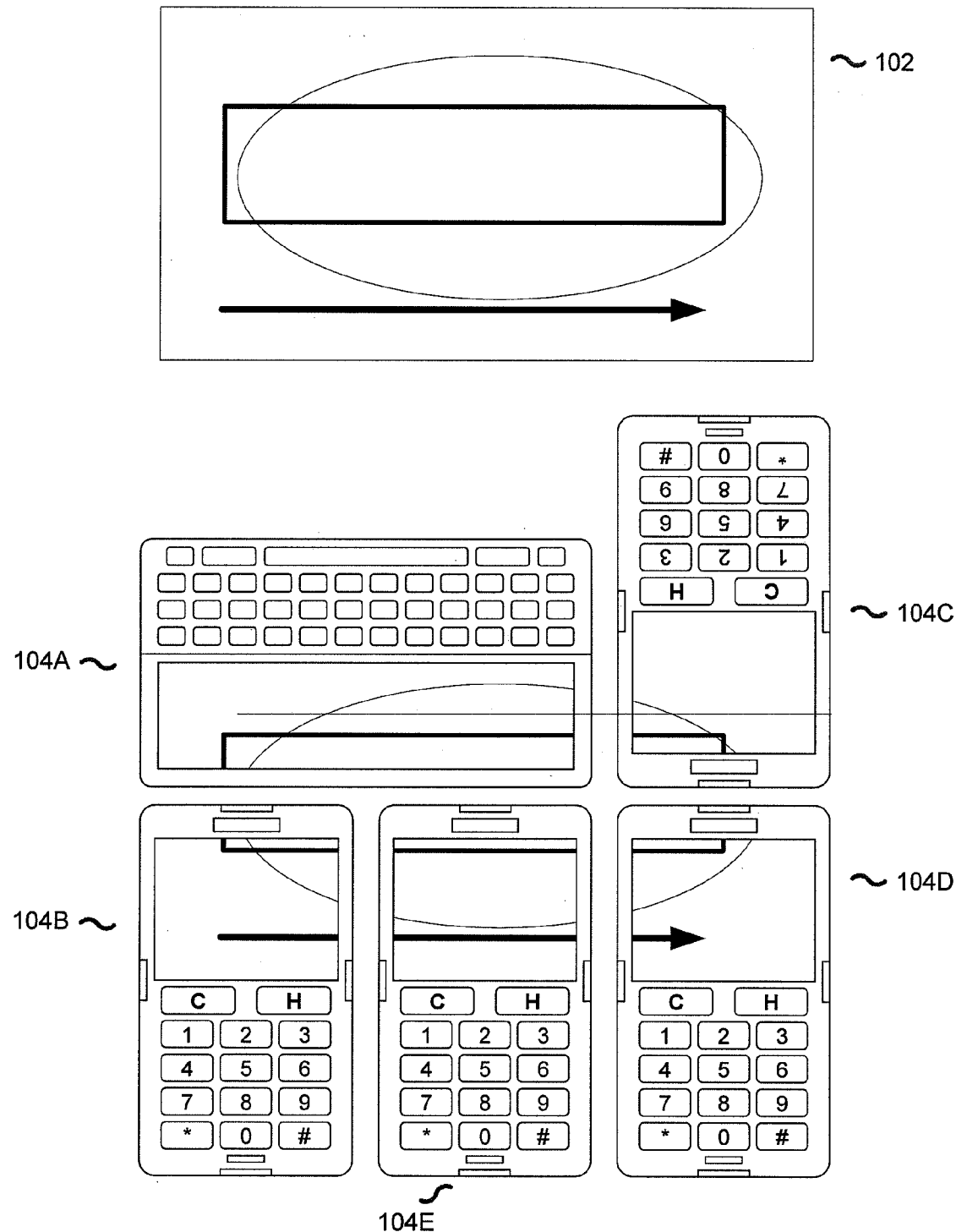
FIG. 1 illustrates multiple user terminals rendering a mosaic of an image in accordance with example embodiments of the present disclosure.

FIG. 1 illustrates multiple user terminals rendering a mosaic of an image in accordance with example embodiments of the present disclosure. As illustrated, FIG. 1 includes an image 102 and multiple user terminals 104A-104E that each includes a display screen. Each of the user terminals 104 may be a mobile communication device, a mobile phone, or a mobile computer, as illustrated, or may also be a digital video recorder (DVR), a set-top box (STB), a server computer, a computer, a hard disc, an Internet browser device, a gaming device, an audio/video player, a digital camera/camcorder, a television, a radio broadcast receiver, a positioning device, a wired or wireless communication device, any combination thereof, and/or any device capable of rendering an image or outputting audio. The image 102 may be a photograph, video, text, composite contents such as webpages, any combination thereof, and/or information capable of being displayed to a user. The image 102 may be included in a medial stream having an audio stream, an audio file, or other audio information. The user terminals 104 may coordinate to create a multi-channel (e.g. stereo or surround) audio experience with or without display of the image 102. For simplicity, the following embodiments are mainly described in the form of rendering a mosaic of media signal that is an image. However, the method and systems apply to rendering of media signals including other types of media, such as, but not limited to, video, graphics, text, speech and audio, and/or any combination thereof. The media signals may be received from a content provider over a network (e.g., broadcast TV, Internet, etc.), or may be a file stored in memory of one or more user terminals 104. The media signals also may be stored in other storage devices, such as a hard drive or other memory local to the user terminal 104, a memory card, or may be stored remote from the user terminal 104.

The user terminals 104 may be positioned to display a mosaic of the image 102 as seen in the lower portion of FIG. 1. The mosaic of the image 102 may be reproduced on the display screens of the respective user terminals 104, where each of the user terminals 104 renders a subsection of the image 102 such that the user terminals 104 display a mosaic of the image 102.

The multiple user terminals 104 may be dynamically combined to form a mosaic rendering group. Where the medial signal includes video, the user terminals 104 may coordinate as a virtual rendering device to cause display of a mosaic of the video. Where the media signal includes audio, the user terminals 104 may coordinate to create a surround sound experience with or without a corresponding display of an image 102. The mosaic rendering group can render different kinds of media: both plain retrieval-style streaming (e.g., TV) and interactive content (e.g., distributed gaming, conversational video, etc.). In an example, the user terminals 104 may coordinate to display a video wall. For simplicity, the following describes retrieval-style video streaming. Other interaction styles and media types are simply different variations of this theme.

Figure 2:
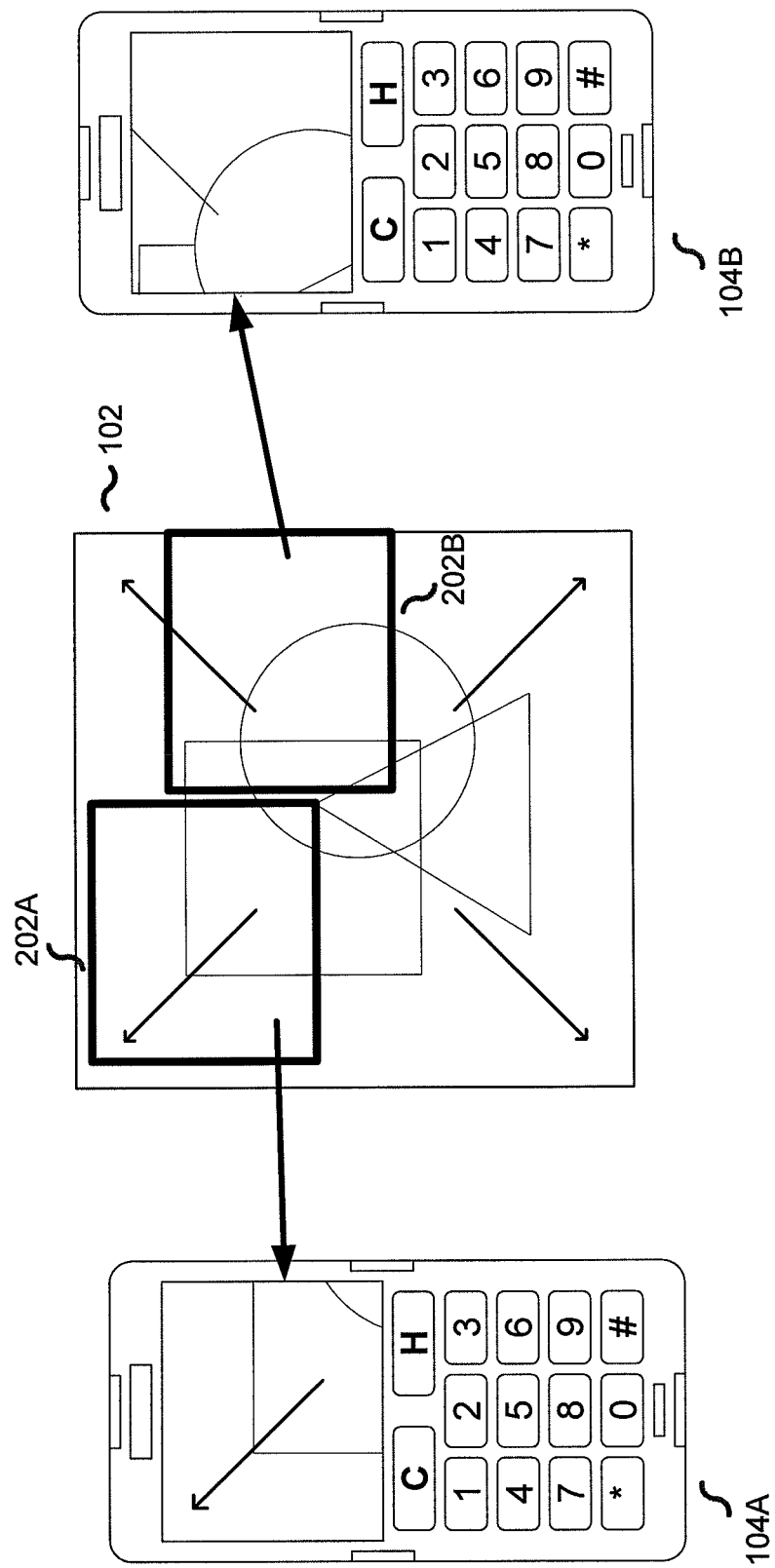
FIG. 2 illustrates user terminals coordinating to display different subsections to render a mosaic of an image in accordance with example embodiments of the present disclosure.

FIG. 2 illustrates user terminals coordinating to display different subsections to render a mosaic in accordance with example embodiments of the present disclosure. FIG. 2 illustrates the entire image 102 and how individual user terminals 104 may be used to zoom into specific subsections. The control of the zooming process may be manual (e.g., key presses), altering the position of the user terminal 104 (e.g., lifting to zoom in, lowering to zoom out) or automatic in some form, and/or any combination thereof. To determine which subsection of the image 102 to display, the user terminals 104A and 104B may prompt and receive inputs from a user to select a subsection of an image 102 for display in the mosaic. The user may instruct the user terminal 104A to select, for instance, subsection 202A for display at user terminal 104A. Similarly, user may instruct the user terminal 104A to select, for instance, subsection 202B for display at user terminal 104B. Also, the user terminals 104 may automatically select subsections 202 for display without user input based on the spatial relationship of the user terminals 104. As described in further detail below, one of the user terminals may be elected a master user terminal and may instruct the other user terminal to display a subsection 202. The user terminals 104 may also select subsections 202 based on stored user preferences generated by monitoring previous user selections.

Figure 3:
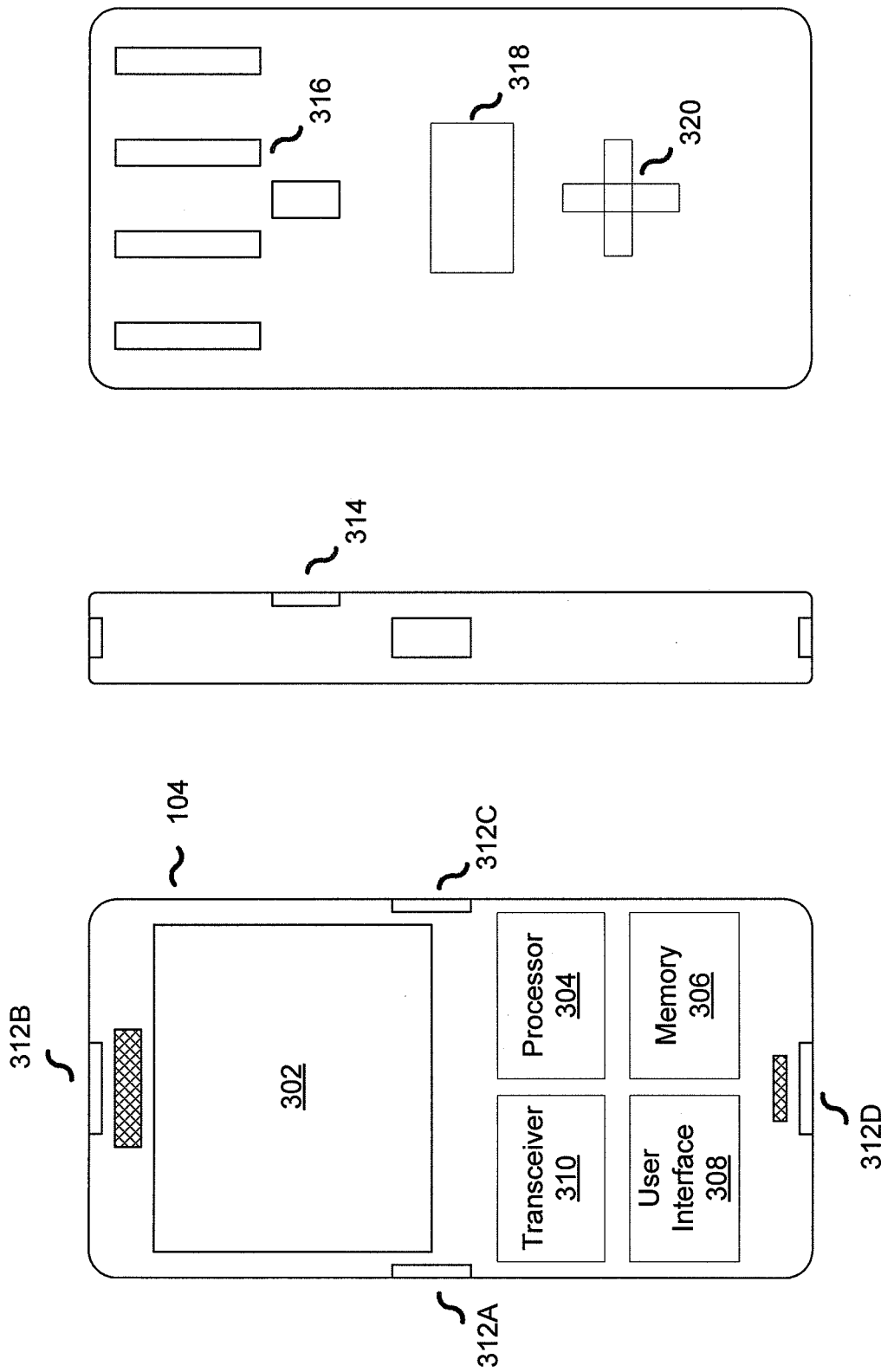
FIG. 3 illustrates a front, a side, and a back view of components of a user terminal in accordance with example embodiments of the present disclosure.

FIG. 3 illustrates a front, a side, and a back view of components of a user terminal in accordance with example embodiments of the present disclosure. In the depicted example, the user terminal 104 may include a display 302, a processor 304, a memory 306 or other computer readable media and/or other storage, a user interface 308, and a transceiver 310. The memory 306 may store a data file of a media stream or may buffer a received media signal including, for example, video and/or audio. The user interface 308 may include a keypad, touch screen, voice interface, four arrow keys, joy-stick, data glove, mouse, roller ball, touch screen, or other suitable device for receiving input from a user to control the user terminal 104.

Computer executable instructions and data used by processor 304 and other components within user terminal 104 may be stored in the memory 306 in order to carry out any of the method steps and functions described herein. The memory 306 may be implemented with any combination of read only memory modules or random access memory modules, optionally including both volatile and nonvolatile memory. Also, some or all of the computer executable instructions may be embodied in hardware or firmware (not shown).

FIG. 3 illustrates an example arrangement of the position sensors 312 on one of the user terminals 104. The position sensors 312 may determine the spatial positioning of user terminals 104 relative to each other. The user terminals 104 may include position sensors 312A-312D placed at various locations on the housing of the user terminals 104. As seen in the front view in FIG. 3, the user terminal 104 may includes a position sensor 312A located on its left side, a position sensor 312B on its top side, a position sensor 312C on its right side, and a position sensor 312D on its bottom side. The position sensors 312 may be arranged on the user terminal 104 in other manners than that shown in FIG. 3, and more or fewer position sensors may be used. For instance, the position sensors 312 may be located on a front and back of the user terminal 104 to determine if the user terminal 104 is partially overlapping another user terminal 104. Operation of the position sensors 312 is further described below with reference to FIGS. 4-5.

The user terminal 104 may include a distance sensor 314 to determine a distance between a back of the user terminal 104 and a surface. The distance sensor 314 may determine the distance using optical and/or radar-style mechanisms, received signal strength, any combination thereof, and/or other techniques for determining distance. For example, when determining distance based on received signal strength, the transmitting distance sensor 314 may include a power of the transmitted signal in the transmitted signal. The distance sensor 314 may comprise a transmitter of a predefined power and a receiver. The receiver may measure signal strength of the signal reflected by a surface. The strength of the reflected wave may depend on the distance to the surface and other properties of the surface, such as, for example, the material and/or the evenness of the surface. Assuming that the other properties of the surface are constant, a change in the received signal strength can correspond to a change in the distance to the surface.

The position sensors 312 may also incorporate distance sensors. Distance sensors may measure a received signal strength to determine a distance. For example, the received signal strength of a signal with a known transmitting power in another device may be used to calculate a distance. The transmitter of the other device may be a Bluetooth transmitter of a certain power class, for example. A user terminal 104 may store transmission/reception characteristic, for example a table of received signal strengths for given distances, in the memory 306 as a database. In an example embodiment, a calibration mode may be used to create such a table at the user terminal 104 for another device. For example, the other device can be placed at certain positions or distances in relation to the user terminal 104, and the user terminal 104 may measure the received signal strength and may store the measurement in the table. Thus, the accuracy of the distance may be improved. Directional antennas or antenna arrays may be used at the user terminal 104 and at the other device to determine the direction of the received radio signal. Other known methods may be used in position sensors 312 to determine a position of user terminal 104 relative to other terminals. The user terminals 104 may use the position sensors 312 and/or the distance sensor 314 to detect each other's presence and may individually determine whether any user terminals 104 are located on its sides as described in further detail below in FIG. 5.

The user terminal 104 may include one or more antennas 316. The antennas 316 may be communicatively coupled to the transceiver 310 to permit the user terminal 104 to communicate with another device such as another user terminal 104 or network access point, such as, for example, a base station (not shown). The antennas 316 can be used to receive media signals over a plurality of channels and to use a plurality of channels for communication with the other user terminals 104. The antennas 316 may communicate signals sent in accordance with various communications protocols, such as, but not limited to, Universal Mobile Telecommunications System (UMTS), Global System for Mobile Communications (GSM), Wireless Local Area Network/Bluetooth (WLAN/BT), or other types of communications protocols.

The transceiver 310 may receive a broadcast, multicast, or unicast media signal from a content provider (not shown). The content provider may broadcast a media signal as an analog or digital signal that is received via the transceiver 310. In an example, the content provider may include an external transmitter to broadcast a media signal that includes the image 102, video, audio, any combination thereof, or other types of media in accordance with the Digital Video Broadcasting (DVB) format. The broadcast media signal may be simultaneously received by multiple user terminals 104, as well as other devices. In an example, the content provider may provide broadcast internet protocol television (IPTV), streaming host service providers such as YouTube or other Internet multimedia streaming portals.

The content provider may transmit, for instance, a broadcast Internet information transmission. The broadcast Internet information transmission may be time sliced, such as in the DVB-Handheld format. Time-slicing may reduce the average power consumption of the user terminal 104 and may enable smooth and seamless handover. Time-slicing may comprise sending data in bursts using a higher instantaneous bit rate as compared to the bit rate required if the data were transmitted using a traditional streaming mechanism. In an example, the memory 306 of the user terminal 104 may have one or more buffer memories for storing the decoded transmission before presentation. The one or more buffers also may be used in non-time sliced transmission due to synchronization delay to prepare the data for all connected user terminals.

The user terminal 104 may include a Global Positioning System (GPS) processor 318 and a motion and orientation (MO) sensor 320. The GPS processor 318 may acquire a GPS signal to determine a location of the user terminal 104. The GPS processor 318 of the user terminal 104 may use the location determined from GPS to identify its spatial location relative to other user terminals. Positioning systems other than GPS also may be used. Generally, any positioning system having sufficient granularity can be used to determine an absolute spatial position of the user terminal 104 which can be used in addition to determining the spatial positioning relative to the other user terminals 104. The use of absolute spatial positioning may help detect large scale motion changes when the position sensors 312 do not have sufficient range.

The MO sensor 320 may be used to determine a velocity and/or acceleration of the user terminal 104, as well as a rotational movement. The MO sensor 320 may further indicate whether the user terminal 104 is facing upwards, upside down, any combination thereof, and/or other orientations, for example, by being sensitive to gravity.

More or fewer of the instances of each component depicted in FIG. 3 may be used. Moreover, the functions performed by each of the devices illustrated in FIG. 3 may be split and performed by multiple devices and/or the functions performed by illustrated devices may be integrated with one another.

Figure 4:
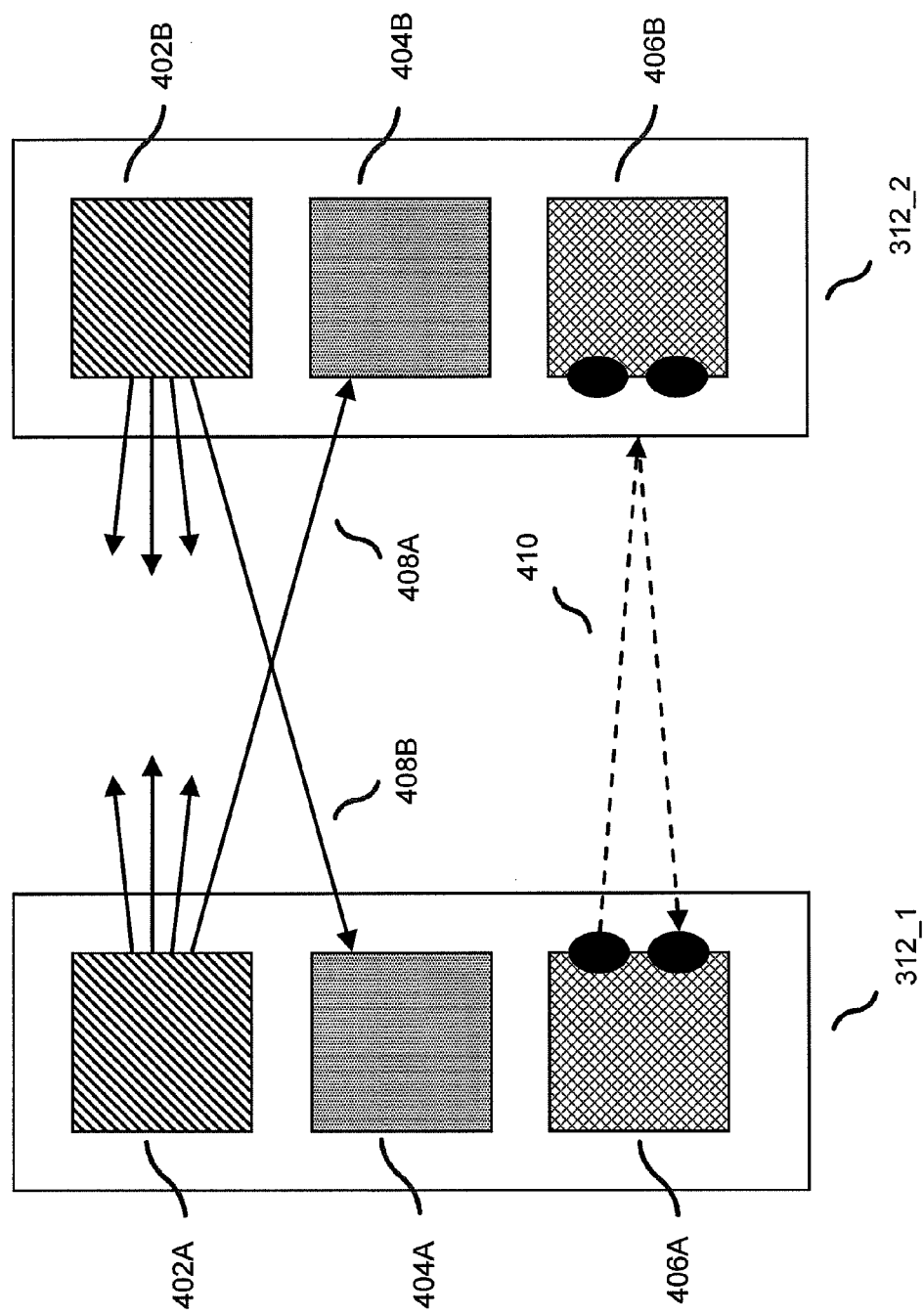
FIG. 4 illustrates position sensors of a user terminal for sensing of neighbor user terminals in accordance with example embodiments of the present disclosure.

FIG. 4 illustrates components of position sensors 312 of a user terminal 104 for sensing of neighbor user terminals in accordance with example embodiments of the present disclosure. Each position sensor 312 may include a radio frequency identification (RFID) transmitter 402, a RFID reader 404, and a distance sensor 406. Position sensor 312_1 may be included on a first user terminal 104, and position sensor 312_2 may be included on a second user terminal 104. In an example, the RFID transmitter 402 and the RFID reader 404 may communicate over a distance of at least one to ten or more centimeters. RFID transmitter 402A of position sensor 312_1 may transmit a signal 408A. The signal 408A may be a radio frequency signal, for example. The signal 408A may include a user terminal identifier to uniquely identify the first user terminal 104. RFID receiver 404B of position sensor 312_2 may receive the signal 408A and the second user terminal 104 may process the received user terminal identifier to determine the identity of the first user terminal 104A. Analogously, the position sensor 312_2 of the second user terminal 104 may transmit a signal 408B. RFID receiver 404A of position sensor 312_1 may receive the signal 408B and the first user terminal 104 may process the user terminal identifier to determine the identity of the second user terminal 104. Also, the position sensor 312 may emit other signals instead of or in addition to radio frequency signals, such as, but not limited to, infrared signals, ultrasonic signals, other types of signals for communicating information, and/or any combination thereof.

The distance sensor 406 of the position sensor 312 may determine a distance between user terminals 104. For example, distance sensor 406A may communicate signal 410 and may measure the round trip propagation time to determine the distance between the user terminals 104 or may determine a distance based on received signal strength, as discussed above. In an example, the distance sensor may measure distances from a few centimeters to a few meters or more.

Figure 5:
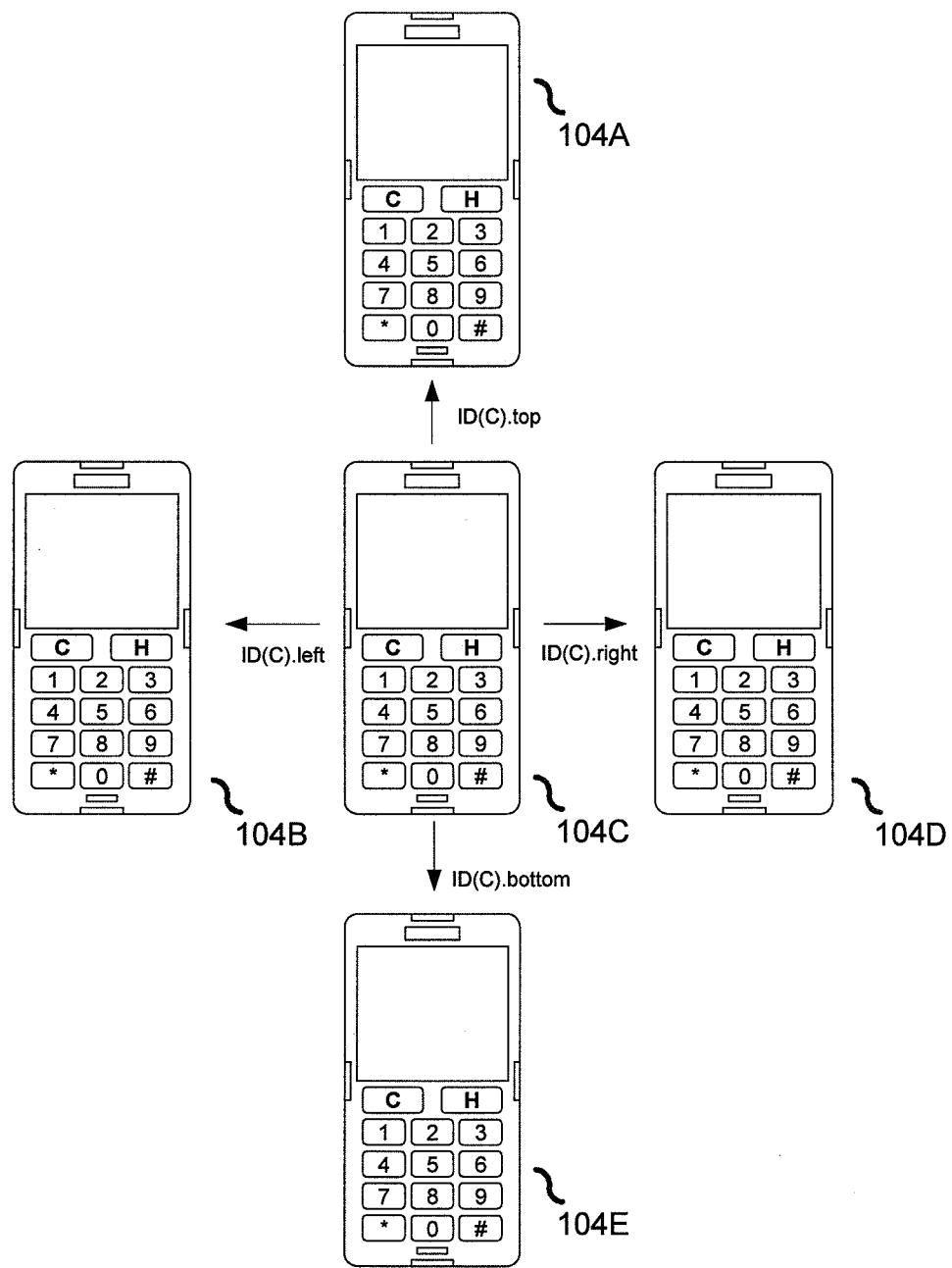
FIG. 5 illustrates multiple user terminals communicating with one another to determine their relative positioning in accordance with example embodiments of the present disclosure.

FIG. 5 illustrates multiple user terminals communicating with one another to determine their relative spatial positioning in accordance with example embodiments of the present disclosure. The user terminals 104 may communicate messages to one another so that each user terminal 104 can identify its relative spatial positioning. For instance, each of the RF transmitters 402 of each position sensor 312 of the user terminals 104 may communicate one or more signals to the surrounding user terminals 104. The signals may include a user terminal identifier uniquely identifying the transmitting user terminal and may identify out of which position sensor 312 the signal was transmitted. As illustrated in FIG. 5, the user terminal 104C may communicate a signal including message "ID(C).Right" to terminal 104D. ID(C) may represent the unique user terminal identifier of user terminal 104C, and "Right" may represent out of which position sensor 312 of user terminal 104C the signal was transmitted. For instance, the user terminal identifier ID(C) may be a sequence of unique numbers, codes, symbols, or other information. The user terminal 104C also may transmit similar messages (ID (C).bottom, ID(C).top, and ID(C).left) to the other user terminals 104 out of the respective position sensors 312. Also, the user terminal 104 may communicate ID(C).above and/or ID(C).below to detect if two or more user terminals 104 are overlapping.

Figure 6:
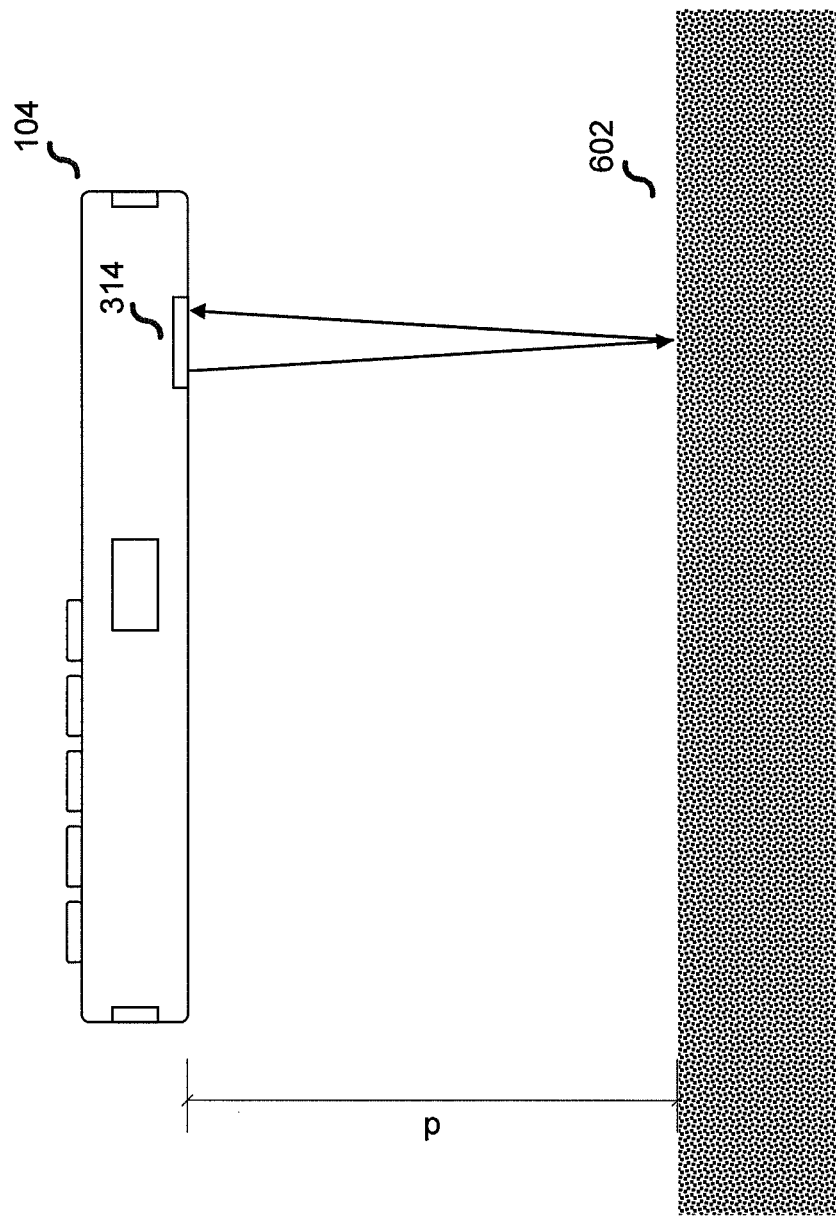
FIG. 6 illustrates operation of a distance sensor of a user terminal in accordance with example embodiments of the present disclosure.

FIG. 6 illustrates operation of distance sensor 314 of a user terminal 104 in accordance with example embodiments of the present disclosure. As illustrated, the distance sensor 314 may communicate a signal to a surface 602 and may measure a round trip travel time of the signal to reflecting off of the surface 602. For instance, FIG. 6 illustrates a user terminal 104 communicating a signal that reflects off of the surface 602 that is a distance d away from the user terminal 104. The user terminal 104 may determine the distance d based on a round-trip propagation time between the user terminal 104 and the surface 602. For example, if the propagation speed of the signal is v in meters per second, while the round-trip propagation time is t seconds, then the distance d is then equal to half of the product of v and t, in units of meters. The value may be a decimal fraction. Other methods for determining the distance d also may be used.

Figure 8:
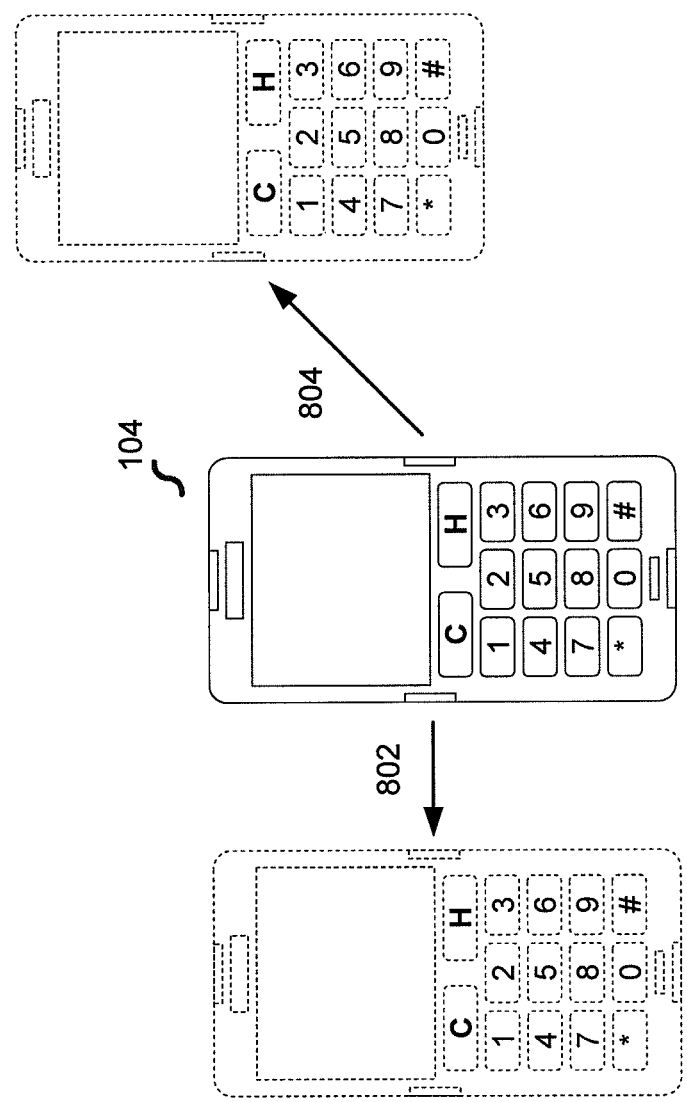
FIG. 8 illustrates types of lateral movement detected by a motion and orientation sensor in accordance with example embodiments of the present disclosure.

FIG. 7 illustrates operation of motion and orientation sensor 320 of a user terminal 104 in accordance with example embodiments of the present disclosure. The motion and orientation (MO) sensor 320 may determine changes in motion and orientation of the user terminal 104. For instance, the MO sensor 320 may determine motions such as, but not limited to, lifting, tilting, and sideways motion. As illustrated, the MO sensor 320 may determine that the user terminal 104 has changed an elevation relative to a surface, or that the user terminal 104 has rotated. For instance, FIG. 7 illustrates user terminal 104 being rotated about an axis 702, elevated in direction 704, and lowered in direction 706. The MO sensor 320 may determine the angle of the user terminal 104 relative to a horizontal plane by determining the direction of gravity, and also may determine a distance to a surface. The MO sensor 320 also may determine lateral movements, as illustrated by arrows 802 and 804 in FIG. 8.

FIG. 9 illustrates example group topologies of user terminals in accordance with example embodiments of the present disclosure. A user may position the display 302 of the user terminals 104 end to end such as illustrated in group topology 902. A user also may position the user terminals 104 so that they partially overlap such that the display 302 of each is visible, as seen in group topology 904. Other group topologies may be used. Particularly, any arrangement of two or more user terminals 104 may be used to produce a desired group topology for rendering a mosaic of an image. The determination of the topology may be user controlled. Also, the topology may be automatically determined according to the information of the positioning, distance, and screen size of the user terminals 104, as well as the size and shape of the mosaic image.

Figure 10:
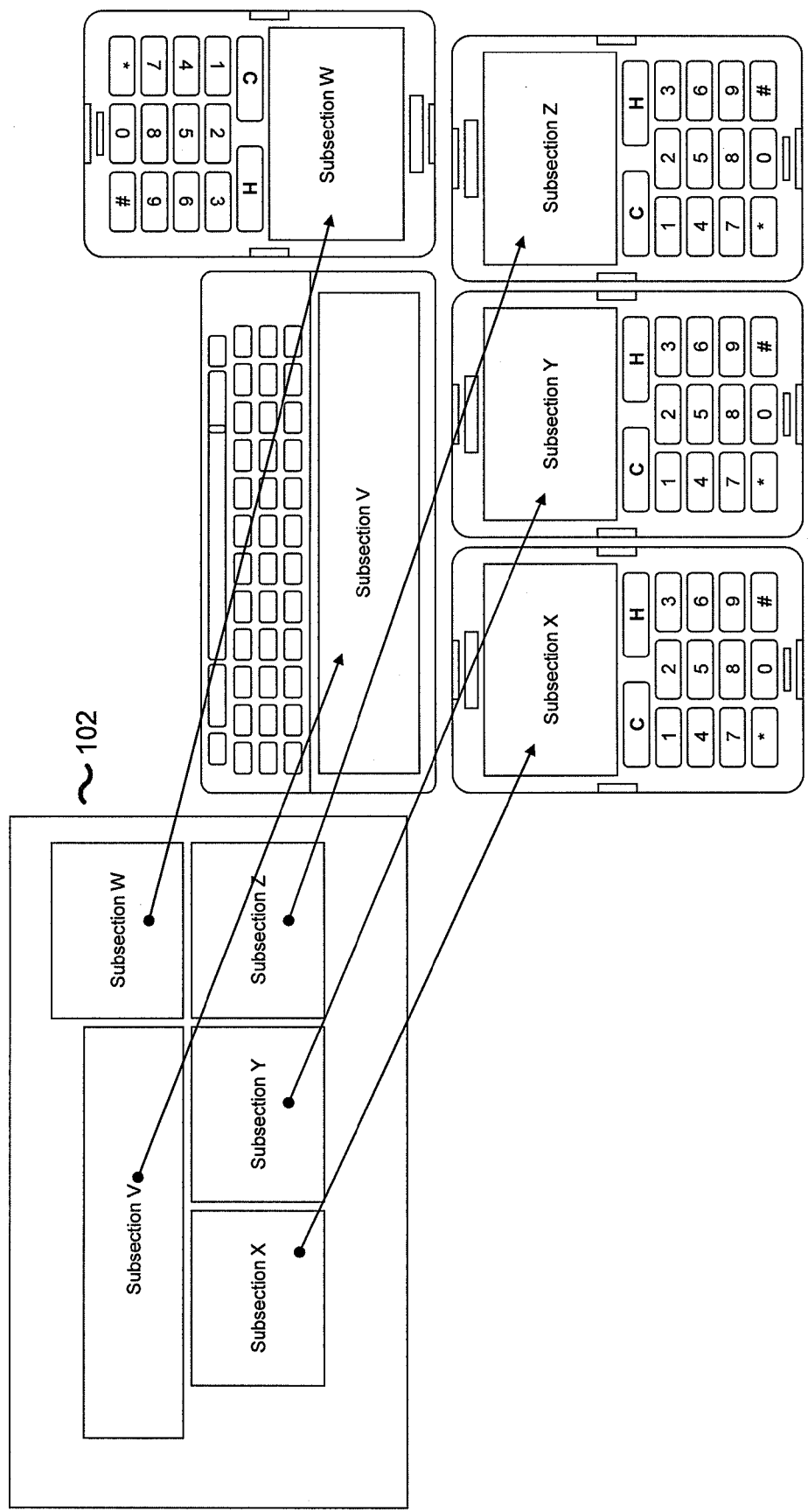
FIG. 10 illustrates coordinating of user terminals to render an image in accordance with example embodiments of the present disclosure.

FIG. 10 illustrates coordinating of user terminals to render an image in accordance with example embodiments of the present disclosure. The image 102 may be divided into subsections, each of which may be rendered on a respective user terminal 104 to produce a mosaic of the image 102. For instance, the image 102 may be divided into subsections V, W, X, Y, and Z, and five user terminals 104 may be assigned to render a respective subsection. For example, a first user terminal 104 may display subsection V, a second user terminal 104 may display subsection W, and so forth.

If, for example, less than the entire image 102 is displayed, a user may move a user terminal 104 to explore currently non-displayed areas of the image 102. The user also may move the user terminal 104 behind or in front of the other members of the mosaic rendering group to zoom in and out of selected areas of the image 102. Further, the user may use the user interface 308 to control zooming in and out. For instance, a user may control the subsection a user terminal 104 displays by pressing a button on the user interface 308, touch screen interaction with display 302, and/or from physically moving, tilting, or lifting a user terminal 104. For example, the user may move user terminal 104 displaying subsection V in FIG. 10 to cause user terminal 104 to display other portions of the image 102 that may or may not overlap with the other subsections W, X, Y, and Z. A user also may control what a user terminal 104 displays through using auxiliary devices, such as, but not limited to, a Bluetooth periphery. These controls can also be subject to local policy/configuration/preferences. For example, a Bluetooth accessory may be used as a remote control. The Bluetooth accessory may use commands suitable for controlling other user terminals 104 as defined in the audio video remote control profile (AVRCP) in the Bluetooth standard. Commands suitable for controlling other devices may comprise commands for zooming, moving a zoomed image section, returning to a "full screen" view, changing brightness and contrast of the image, other commands, and/or any combination thereof.

Figure 11:
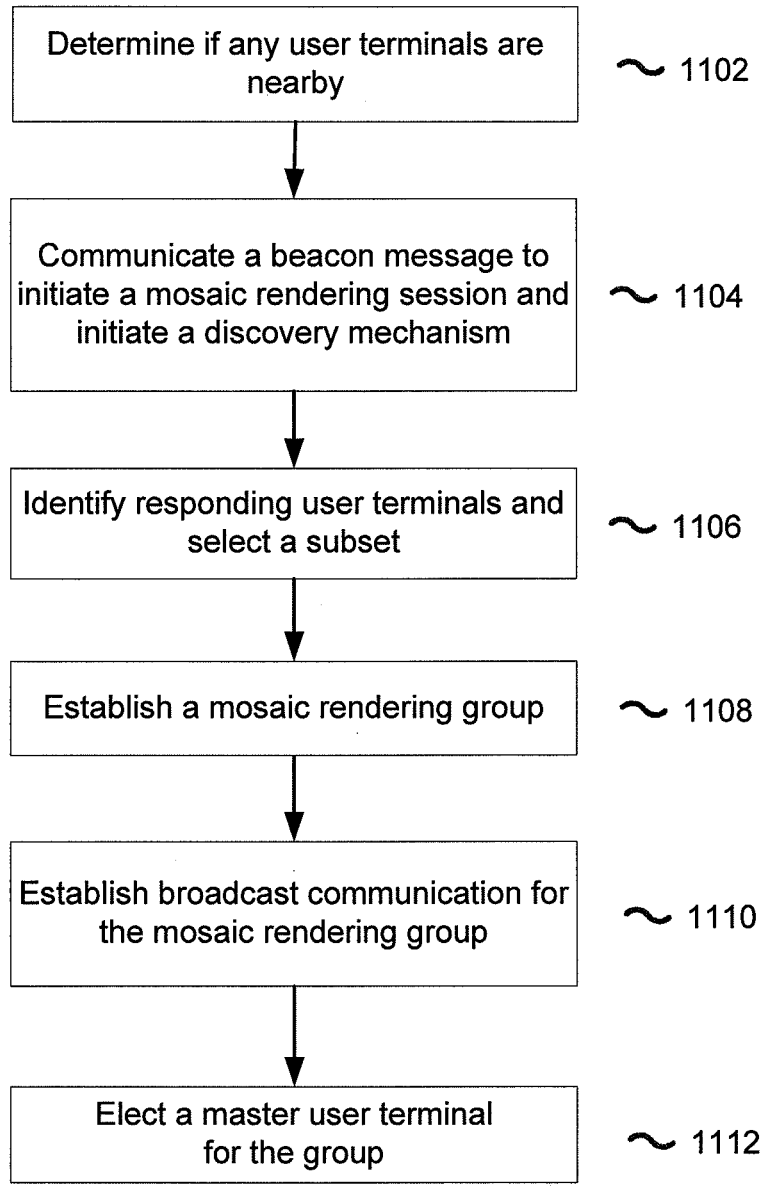
FIG. 11 illustrates a method for establishing a mosaic rendering group and electing a master user terminal in accordance with example embodiments of the present disclosure.
Figure 12:
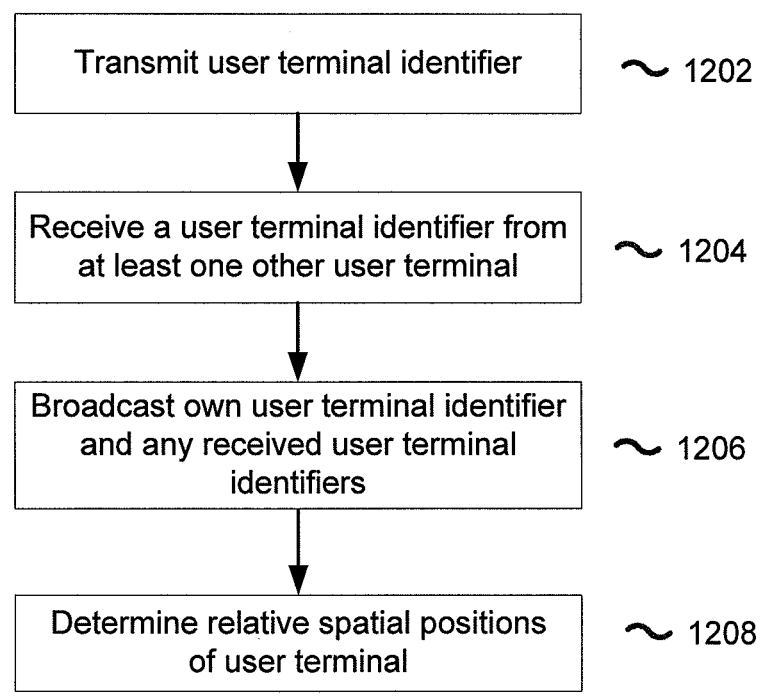
FIG. 12 illustrates a method for determining a group topology for a mosaic rendering group in accordance with example embodiments of the present disclosure.
Figure 13:
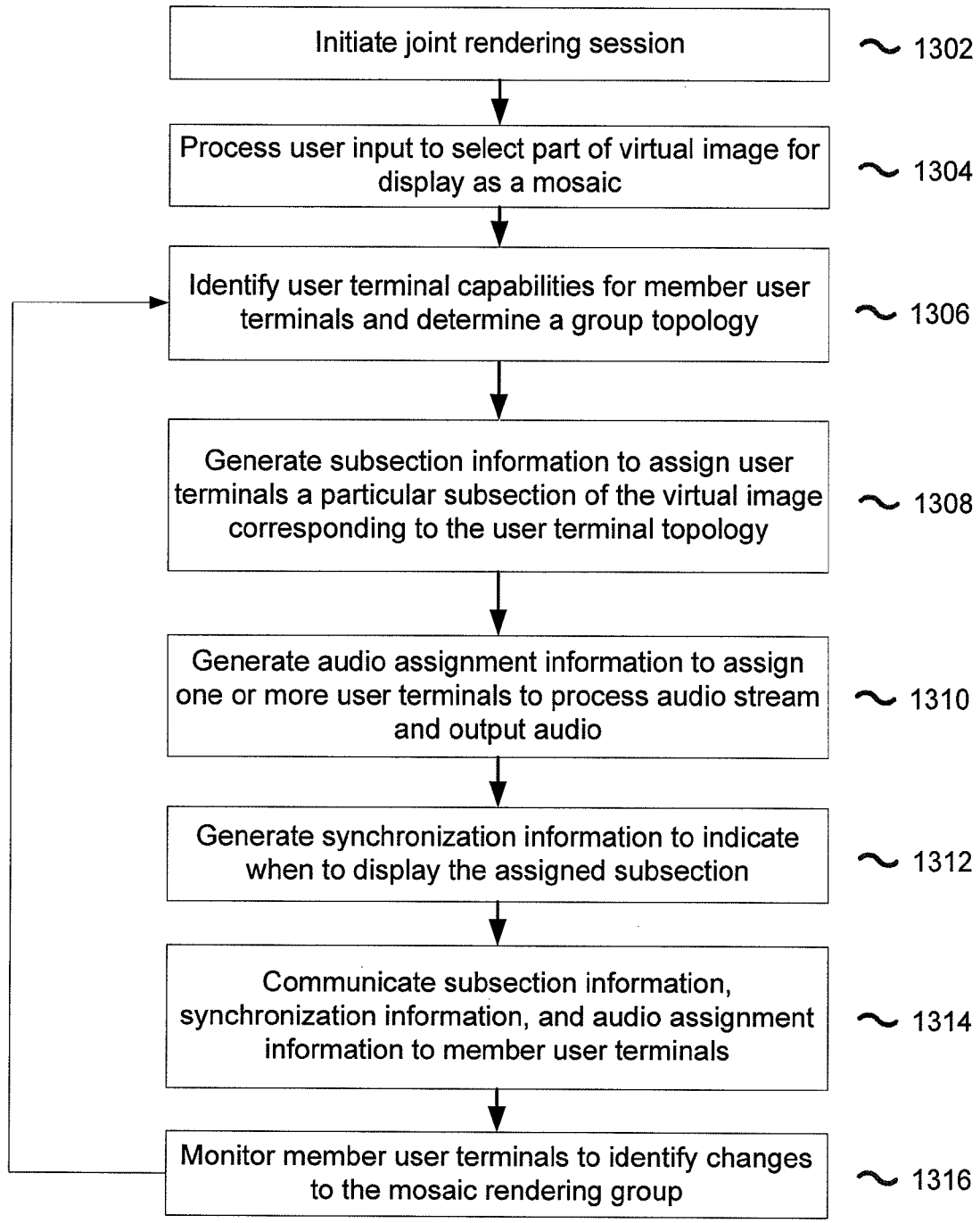
FIG. 13 illustrates a method for establishing a joint rendering session in accordance with example embodiments of the present disclosure.
Figure 14:
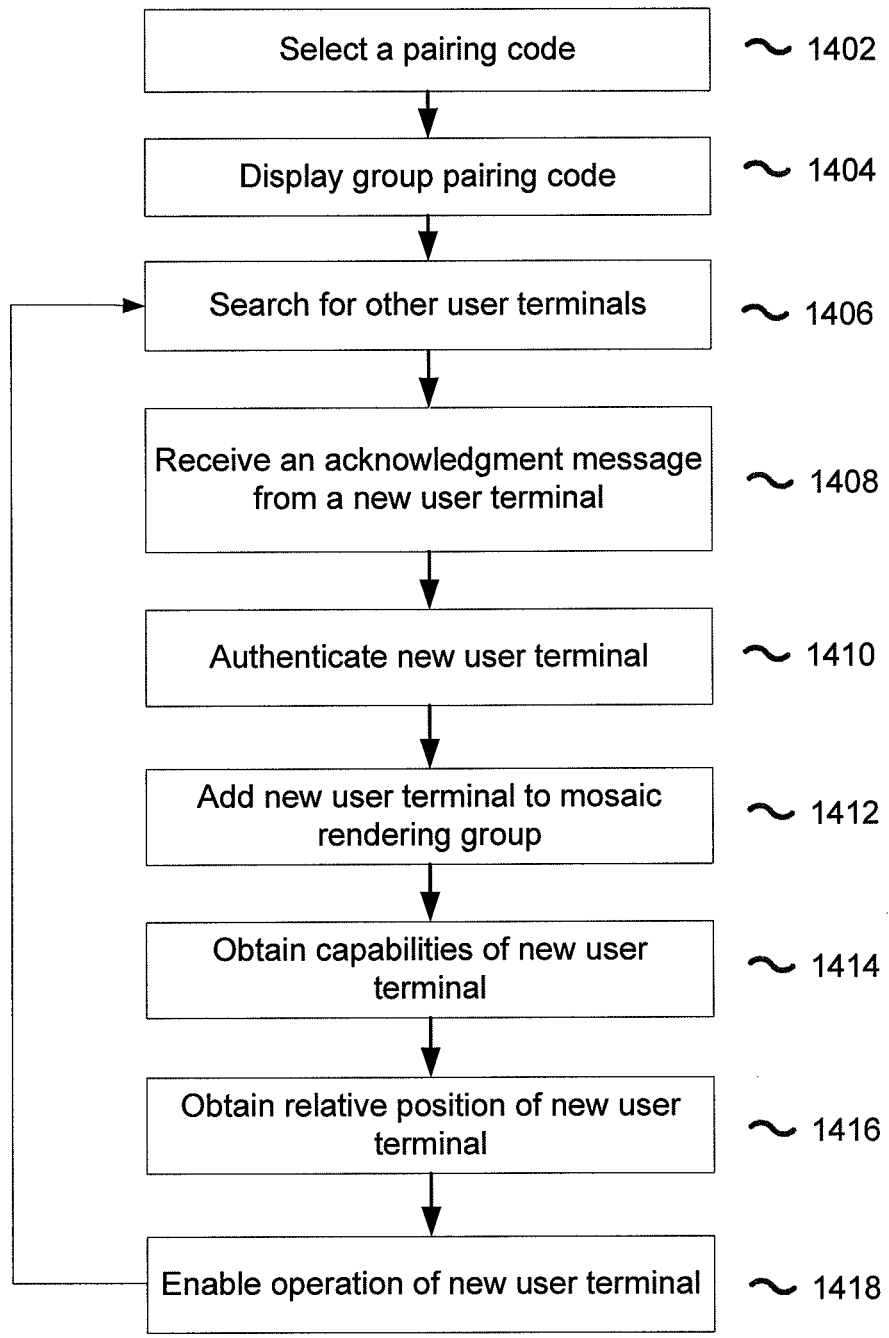
FIG. 14 illustrates a method for a master user terminal adding a new user terminal to a mosaic rendering group in accordance with example embodiments of the present disclosure.
Figure 15:
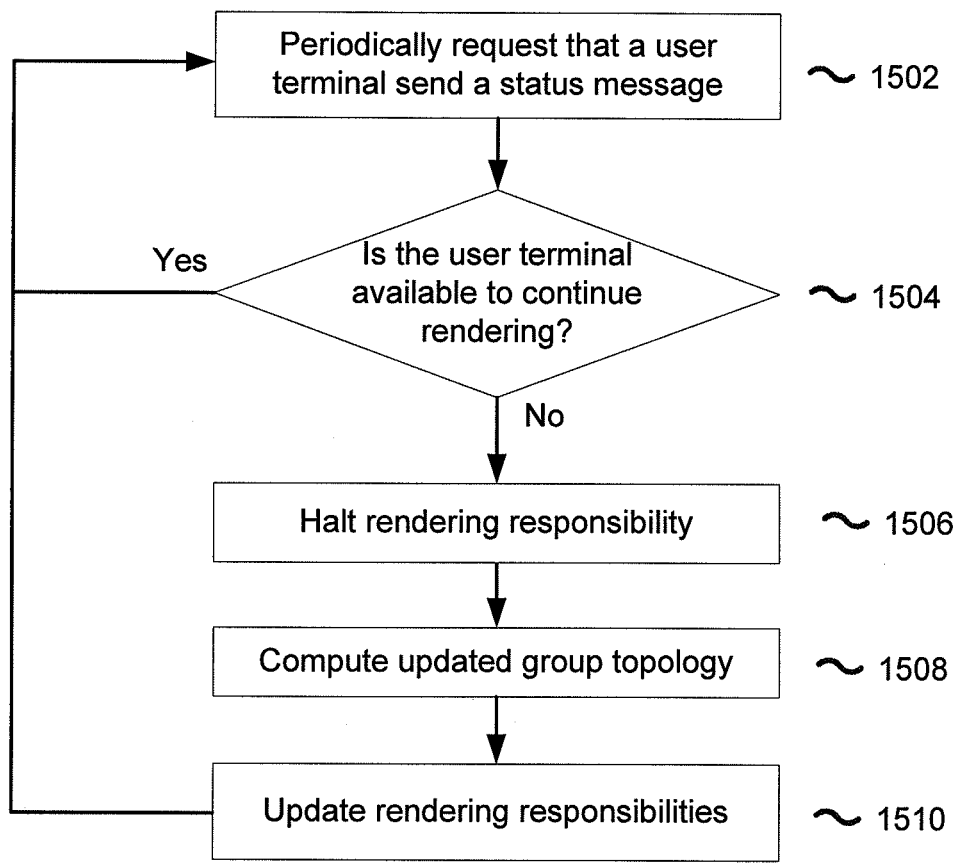
FIG. 15 illustrates a method for monitoring operation of members of the mosaic group to maintain a list of available user terminals in accordance with example embodiments of the present disclosure.

FIGS. 11-15 illustrate methods for coordinating user terminals to render a mosaic display in accordance with example embodiments of the present disclosure. FIG. 11 describes a method for establishing a mosaic rendering group and electing a master user terminal, FIG. 12 illustrates a method for a master user terminal to communicate with member user terminals to generate a group topology for the mosaic rendering group, FIG. 13 illustrates a method for establishing a mosaic rendering session for display of a mosaic of an image by the mosaic rendering group, FIG. 14 illustrates a method for operations of a master user terminal to add a new user terminal to a mosaic rendering group, and FIG. 15 illustrates a method for a master user terminal monitoring the user terminals in the mosaic rendering group to maintain and/or update a group topology.

FIG. 11 illustrates a method for establishing a mosaic rendering group and electing a master user terminal in accordance with example embodiments of the present disclosure. In block 1102, a user terminal 104 may determine whether any user terminals are nearby. For instance, each position sensor 312 of each user terminal 104 can emit a signal indicating both the user terminal identifier and a sensor identifier to indicate the location of the position sensor on the user terminal 104. This is also shown FIG. 5, where the position sensor 312 on the left side of user terminal 104C can emit a signal including the user terminal identifier ID(C) and a sensor identifier including a representation of "left". The user terminal 104 may use this information to determine whether any other user terminals 104 are nearby (e.g., topology 902 in FIG. 9) and/or overlapping (e.g., topology 904 in FIG. 9) and their relative spatial positioning.

In block 1104, a user terminal 104 may communicate a beacon message to initiate a mosaic viewing session. In an example, a user may instruct the user terminal 104 to establish a mosaic rendering session, or the user terminal 104 may attempt to initiate the mosaic rendering session without user input if it is within a certain distance from another user terminal. The user terminal 104 may send the beacon message on at least one well-defined communication channel (e.g., predefined or negotiated channel) to which one or more other user terminals 104 may listen. Each user terminal 104 receiving the beacon message may initiate a discovery mechanism to identify candidate user terminals 104 to form a mosaic rendering group. The discovery mechanism may be based on Bluetooth, Zigbee, or Wireless LAN, or also may be based on other radio, optical, acoustic, or other near field communication and/or sensing technology, and/or any combination thereof. As a part of the discovery mechanism, the user terminals 104 may communicate their capabilities. The capabilities may include static and dynamic capabilities of the user terminals 104. The static capabilities may include size in millimeters, for example, and a pixel resolution of the display 302, supported audio and video codecs, speaker capabilities, wireless interfaces, sensors and sensor-related information, configurable, and master function. The dynamic capabilities may include a battery status, current decoding/rendering delay and media reception timestamps, and current one-way delay from a first user terminal 104 to a second user terminal 104 if media is to be forwarded.

Each of the user terminals 104 receiving the beacon messages may use information learned from the position sensors 312 to communicate securely using authorization and authentication methods and thereby may ensure that securely communicated messages reach or are interpreted only by those user terminals 104 in close proximity.

In block 1106, a user terminal 104 may identify responding user terminals and may select a subset for inclusion in the mosaic rendering group. For example, a user terminal 104 may identify responding user terminals by listing the unique user terminal identifiers for each of the responding user terminals. The user terminal 104 may then select a subset. In an example, the user terminal 104 that initiated the mosaic rendering session ("the initiating user terminal") may select the subset based on manual user input, proximity, consent, manual configuration, device capabilities, and/or any combination thereof. The initiating user terminal 104 may, for instance, display to the user the responding user terminals 104 and the user may select a subset. Also, the initiating user terminal 104 may select the responding user terminals 104 that are within a certain distance. Further, the initiating user terminal 104 may select the subset based on user terminals 104 that have certain minimum device capabilities. Moreover, the initiating user terminal 104 may select the subset based on a manual configuration, by choosing those user terminals 104 terminals that best fit the properties of the mosaic image to be rendered according to capabilities of the user terminals 104. Additionally, the initiating user terminal 104 may include all of the responding user terminals 104 in the mosaic rendering group.

The initiating user terminal 104 may also select the subset based on a manual configuration. For example, initiating user terminal 104 may present a representation of one or more user terminals 104 that are detected to be in a close distance on the display 302. The representation may correspond to one or more user terminal capabilities. For example, the representation may display block outlines of subsections corresponding to the pixel size of the display 302 of the respective user terminals 104. The display of the initiating user terminal 104 may show representations of subsections to be displayed by other user terminals 104. Referring to FIG. 10, the initiating user terminal 104 may display the entire image 102 on its display 302 and outlines of subsections V, W, X, Y, Z, as shown on the image 102. Each of the subsections may correspond to a pixel size of the respective user terminals 104. The user terminal 104 may receive user input, for example at the user interface 308 including a mouse, track ball or multicontroller, etc., to shift around the subsections, such as subsection V, until the representation of the subsections reflect the desired spatial relation of the other user terminals 104 relative to the initiating user terminal 104. Also, the initiating user terminal 104 may simultaneously move two or more of the subsections V, W, X, Y, Z as a group. The initiating user terminal 104 also may automatically display the subsections corresponding to the spatial relationship based on the group topology.

In block 1108, a user terminal 104 may establish a mosaic rendering group to include the responding user terminals 104 included in the subset. To establish the mosaic rendering group, the initiating user terminal 104 may select a common authentication criterion or name. For example, the initiating user terminal 104 sends a password only to those other user terminals 104 included in the rendering group.

In block 1110, the initiating user terminal 104 may establish broadcast communication for the mosaic rendering group. If all of the user terminals 104 are direct neighbors to the initiating user terminal 104, the initiating user terminal 104 may establish a broadcast communication channel by contacting all of the user terminals 104 to be included in the mosaic rendering group and may use group key establishment mechanisms to secure subsequent group communication in this channel.

If not all other user terminals 104 are direct neighbors, the initiating user terminal 104 can establish the communication channel in a step-by-step manner: the initiating user terminal 104 may first establish a broadcast communication channel with its immediately adjacent user terminal 104, which may then securely forward information to respective neighboring user terminals 104 and so on until all user terminals 104 included in the subset have been found and included. Once the mosaic rendering group is established, each user terminal 104 may optionally display an icon or other indicator to indicate that they are included in the mosaic rendering group.

In block 1112, the user terminals 104 for the mosaic rendering group may elect a master user terminal using the established communication channel. For example, the initiating user terminal 104 or another member may elect a master terminal 104 based upon a common criterion, such as, but not limited to, the user terminal 104 having the highest MAC address, SIM card ID, user input, the most remaining battery life, etc. The master user terminal 104 also may be elected by manual user input or based on dynamic and/or static capabilities. For example, each user terminal 104 in the mosaic rendering group may broadcast its user terminal identifier, its capabilities (e.g., resolution, processing capabilities, battery level, reception quality, etc.) and its desire to act as master. Other capabilities also may be used. The user terminal 104 may set a Boolean flag to indicate whether it desires to act as the master, where setting a floating value of the Boolean flag to zero may indicate that the user terminal 104 does not want to act as master and setting the floating value to one may indicate that the user terminal 104 does. The initiating user terminal 104 may then elect a master user terminal 104 or may assume the role if no other user terminals 104 has requested the master role.

The master user terminal 104 may serve as the first point of contact for user terminals 104 not included in the mosaic rendering group. The master user terminal 104 may detect and admit new terminals to the mosaic rendering group, and may monitor the availability of members. The master user terminal 104 also may select the media signal to use, provide synchronization information so that the mosaic may be synchronously displayed, and provide for synchronized stream switching Stream switching can be performed at any random access point of a media signal, by starting to send coded media data at a random access point. For instance, the media stream may include a sequence of coded media frames. A random access point may be a coded media frame included in the medial signal on which no earlier coded frame in the decoding order of coded media frames relies. Also, Bluetooth may be used to synchronize the user terminals 104. The user terminals 104 included in the mosaic rendering group optionally may display an icon or other indicator to indicate that they are members and are operating in a synchronous state.

The master user terminal 104 may collect capability information (e.g., resolution) from all of the member user terminals 104, may assign roles to each user terminal 104 (e.g., which part to display, which does audio, etc.), and may perform control of the mosaic rendering group by selecting which media signal is to be rendered. The master user terminal 104 may use individual and broadcast communication channels to interact with the other user terminals 104. When the master user terminal 104 desires to communicate with one or few other user terminals 104, the master user terminal 104 may use individual communication channel(s). When the master user terminal 104 desires to communicate with all other user terminals 104, the master user terminal 104 may use a broadcast communication channel. The master user terminal 104 may send information relevant to all member user terminals 104 on a broadcast communication channel. In an example embodiment, the master user terminal 104 may send a full image on a broadcast communication channel and may send information on which part to display on individual channels. In an example embodiment, the master user terminal 104 may send assigned subsections of the full image to each member user terminal 104 on an individual channel. In an example embodiment, the master user terminal 104 may send all information on a broadcast communication channel to the member user terminals 104. The member user terminals 104 may select the information corresponding to their assigned subsection of the image 102. In a further example embodiment, the master user terminal 104 may send all information to each member user terminal 104 on the respective individual channels.

The user terminal 104 may be assigned the master role for a limited amount of time. For instance, random numbers can be used to determine priorities of the user terminals 104 in the mosaic rendering group to select which user terminal 104 may serve as the next master user terminal 104. Also, user terminals 104 may be assigned the master role based on their order of appearance/acceptance in the mosaic rendering group or based on user terminal capabilities. The master role may be handed over automatically after expiration of a certain amount of time or based on a manual input by the user. For instance, the master user terminal 104 may provide a graphical user interface at the display 302 prompting the user to select a different user terminal 104 to hand over the master role. The previous master user terminal 104 may then communicate with the new master user terminal 104 and optionally the other user terminals 104 in the mosaic rendering group to initiate and complete the handover. Once the master user terminal 104 has been elected, the master user terminal 104 may communicate with the user terminals 104 of the mosaic rendering group to determine a group topology.

FIG. 12 illustrates a method for determining a group topology of a mosaic rendering group in accordance with example embodiments of the present disclosure. In block 1202, each of the user terminals 104 may broadcast a user terminal identifier and a sensor identifier automatically or in response to a request from the master user terminal 104. FIG. 5, described above, illustrates an example of communicating a user terminal identifier and a sensor identifier.

In block 1204, the user terminals 104 may receive the user terminal identifiers and sensor identifiers from at least one other user terminal. An example of receiving user terminal identifiers is illustrated in FIG. 5.

In block 1206, each of the user terminals 104 may broadcast topology information on the broadcast communication channel of the mosaic render group. The topology information may include the user terminal identifier of the transmitting user terminal 104, as well as each of the received user terminal identifiers and corresponding sensor identifiers. The topology information also may include a relative distance to each of the user terminals 104 that responded to a particular user terminal 104. For example, with reference to FIG. 5, the user terminal 104A may broadcast topology information that includes its own user terminal identifier, the user terminal identifier of user terminal 104C and the sensor identifier "top," and a distance between the user terminal 104A and user terminal 104C.

In block 1208, the master user terminal 104 may receive the topology information from one or more member user terminals 104 of the mosaic rendering group and may determine relative spatial positioning of the member user terminals 104 to generate a group topology. The group topology may define a spatial relationship that identifies relative spatial positioning, distance, and/or orientation of each user terminal 104. Referring to FIG. 5, the master terminal 104 may determine that user terminal 104A is positioned above user terminal 104C, user terminal 104D is to the right of user terminal 104C, user terminal 104E is below user terminal 104C, and user terminal 104B is to the left of user terminal 104C. The master terminal 104 also may determine a distance between respective user terminals 104 and an orientation. For instance, the master terminal 104 may indicate in the group topology that user terminal 104B is ten centimeters to the left of user terminal 104C. In another example, the master user terminal 104 may determine that user terminals 104A and 104C are oriented upside down with respect to the other user terminals, as illustrated in FIG. 1. The master user terminal 104 may use the group topology when assigning subsections of the image 102 for display at the members of the mosaic rendering group.

In additional to the automated topology detection described above in FIG. 12, the user of the user terminals 104 may choose a predefined system configuration from a menu (e.g., 2×2, 3×2, 4×3), may manually configure the layout, and/or may manually assign the position of the user terminals 104. For instance, the display 302 of a user terminal 104 may display a sample topology that the user may select. In this example, position sensors 312 may be omitted. The user also may manually input or the user terminals 104 of the mosaic rendering group may locally communicate to determine user terminal capabilities and/or user terminal types.

FIG. 13 illustrates a method for establishing a joint rendering session in accordance with example embodiments of the present disclosure. In block 1302, a master user terminal 104 may communicate a request to initiate a joint rendering session. Other user terminals 104 in the mosaic rendering group also may communicate this request. The master user terminal 104 or the user may then select which media signal to render. For instance, the content provider may broadcast multiple media streams, any one of which may be rendered by the user terminals 104.

Once selected, the master user terminal 104 may inform the members of the mosaic rendering group of the selected media signal. The media signal may be independently received by all of the user terminals 104 of the mosaic rendering group from the content provider (e.g., via their own antenna 316 from a broadcaster broadcasting on a broadcast channel) and/or the media signal can be received by the master or other user terminal 104, which may forward the assigned subsections of the media signal or the entire media signal to the other user terminals of the mosaic rendering group. If all of the user terminals 104 receive the media signal, such as a broadcast from a content provider, the user terminals 104 may render only a fraction of the media signal with an appropriate zoom level to display the assigned subsection. Because only a fraction of the media signal is received, the content provider can transmit higher resolution streams. The content provider may code stream subdivisions and the user terminal 104 may display the assigned subdivision, such as, for example, animation using MPEG-2.

In another example, the master user terminal 104 may receive the media signal and may redistribute the assigned portions of the media signal to one or more of the other user terminals 104 of the mosaic rendering group. A portion of the media signal may be redistributed to the other user terminals 104 by the master user terminal 104 by using an individual communication channel or a broadcast/multicast channel. When the master user terminal 104 only wants to redistribute a portion of the media signal to one or few other user terminals 104, the master user terminal 104 may use the individual communication channel(s). When the master user terminal 104 only wants to redistribute a portion of the media signal to all other user terminals 104, the master user terminal 104 may use the broadcast communication channel. Also, the master user terminal 104 may communicate a message via the broadcast communication channel or via one or more individual communication channels instructing one or more of the user terminals 104 in the mosaic rendering group to start and/or stop rendering of the medial signal.

In block 1304, the master user terminal 104 may prompt the user to select one or more subsections of an image and may process the user input to select a subsection of the image to display as a mosaic of the image 102. For instance, the master user terminal 104 may receive an input from the user selecting one or more subsections of an image 102 that the user desires to have the mosaic rendering group render as a mosaic display. The user may select which portion of the overall image they would like to have displayed, an offset, a zoom factor, etc. For instance, a user using the master user terminal 104 or another user terminal 104 may select which media signal to display, which subsections of the image 102 of the media signal to display, and/or which zoom factor to use for each of the user terminals 104 of the mosaic rendering group. Optionally, the master user terminal 104 may automatically select subsections of an image 102 to assign for rendering without any user input.

In block 1306, the master user terminal 104 may identify the user terminal capabilities of each of the user terminals 104 included in the mosaic rendering group and the group topology of the mosaic rendering group. For instance, the master user terminal 104 may retrieve the user terminal capabilities and the group topology from the memory 306. Based on the group topology and the user terminal capabilities, the master user terminal 104 can determine which user terminals 104 are nearby and their available screen resolution and layout adapted by the various aspect ratios and/or pixel dimensions, which user terminal 104 is in which position and covers which part of the image 102, and which orientation each user terminal 104 has relative to one another.

In block 1308, the master user terminal 104 may assign subsections of the image to respective user terminals and may generate subsection information to inform the user terminals of their respective assignments. The master user terminal 104 may calculate which subsection of the image 102 each user terminal 104 is to render. The rendering control for the image 102 may be manual and/or automated. For example, for a media signal that includes video, the master user terminal 104 may determine the overall available size of the displays 302 of the member user terminals 104 and may provide automatic scaling of the received media signal based on the overall available size. For example, if the desired display size of the mosaic image is 1280×960 pixels, while the overall available size is 640×480 pixels, then the master user terminal 104 may scale down by half the horizontal and vertical dimensions of the mosaic image.

In defining a subsection, the master user terminal 104 may define a rectangular region on image 102 defined by sets of coordinates (x1, y1) and (x2, y2) to assign to each user terminal 104 and may include the assigned coordinates corresponding to the assigned subsection of the image 102 to display in the subsection information. Similar considerations can be applied where the master user terminal 104 may assign which audio stream(s), if any, respective user terminals are to process and output audio. For a media signal that includes video or images, the aspect ratio of the received image 102 may or may not be preserved. For example, if the aspect ratio of the received image is the same as the aspect ratio of the overall display provided by the user terminals 104, then straightforwardly the aspect ratio of the received image is preserved. If the aspect ratio of the received image is not the same as the aspect ratio of the overall display provided by the user terminals 104, the aspect ratio of the received image may be preserved by not filling the overall display size, for example by leaving blank margins on one or more sides of the overall display. Otherwise, the aspect ratio may be changed during displaying. For example, the aspect ratio may be changed in order to fill a larger area of the overall display.

The master user terminal 104 also may assign subsections of the image 102 based upon the capabilities of the user terminal 104 and their relative spatial positioning. The master user terminal 104 may take into account the capabilities of each user terminal 104 when making the assignment. For example, when the media signal to be rendered includes video, the master user terminal 104 may use the screen resolution and pixel size of the respective user terminals 104 to get both the correct dimensions and aspect ratio, and may instruct the user terminals 104 to perform appropriate scaling so that the overall image does not appear distorted. For example, when the portion of the image to be displayed by one user terminal 104 has a pixel size of 320×240 pixels, whereas the display of the user terminal 104 has a pixel size of 640×480, then the user terminal 104 may scale up at least a portion of the image in each of the horizontal and vertical dimensions by two.

Referring to FIG. 10, for example, the master user terminal 104 may determine the relative spatial positioning and a display screen size for each of the user terminals 104 of the mosaic rendering group. The master user terminal 104 may assign different subsections, which may or may not overlap, of the image 102 to respective user terminals. As seen in FIG. 10, the master user terminal 104 may identify subsections V, W, X, Y, and Z of the image 102 in the subsection information to assign these subsections to respective user terminals 104.

In block 1310, the master user terminal 104 may generate audio assignment information for user terminals 104 of the mosaic rendering group. For instance, the master user terminal 104 may assign certain user terminals 104 of the mosaic rendering group to process audio of the media signal and to output sound. The audio assignment information may be used to create stereo or other audio effects. For example, when the number of user terminals 104 in the mosaic rendering group is four, two on the left may be assigned to play one audio channel of a stereo audio signal, while the other two may be assigned to play the other audio channel of the same stereo audio signal.

In block 1312, the master user terminal 104 may generate synchronization information for the members of the mosaic rendering group. The synchronization information may instruct a user terminal 104 when to display its assigned subsection of the media signal. For instance, the media signal may include video having a sequence of images and the synchronization information may instruct a user terminal 104 when to display its assigned subsection of a particular image in the sequence. The user terminals 104 of the mosaic rendering group also may report their respective delays, which may be based on clock skew, signal processing delays, buffer consistency, and/or any combination thereof, in rendering the display. The master user terminal 104 may then determine a common upper bound to provide a reference clock in the synchronization information so that the user terminals 104 can render a mosaic display of synchronized images, such as video, for example.

In block 1314, the master user terminal 104 may communicate the synchronization information, the subsection information, and the audio assignment information to the member user terminals 104 of the mosaic rendering group. The synchronization information, the subsection information, and the audio assignment information may be broadcast repeatedly, as in a soft state, and/or may be communicated point-to-point between the member user terminals 104 with confirmation being communicated to the master user terminal 104. The "soft state" may refers to unacknowledged distribution of one or more of the synchronization information, subsection information, and the audio assignment information. The user terminals 104 of the mosaic rendering group may process the synchronization information to synchronously render their assigned subsections of the visual image 102 and/or to output audio.

In block 1316, the master user terminal 104 may monitor the members of the mosaic rendering group to determine if any changes have occurred. For instance, the master user terminal 104 may add or remove user terminals 104 from the mosaic rendering group. The user terminals 104 may be added as described in FIG. 14 below. Similarly user terminals 104 may be removed from the mosaic rendering group as described below in FIG. 15. As members are added or removed the master user terminal 104 may return to block 1306 to identify capabilities of new members and also to update the group topology as appropriate.

FIG. 14 illustrates a method of a master user terminal adding a new user terminal to a mosaic rendering group in accordance with example embodiments of the present disclosure. In block 1402, the master user terminal 104 may select a pairing code. A pairing code may be used to allow new user terminals to join the group. The new terminals attempting to join the group may provide this pairing code as part of a joining authentication mechanism. The pairing code may consist of a string of characters and/or numbers. The pairing code may be user generated or by using some automated means.

In block 1404, the master user terminal 104 may display a group pairing code. The group pairing code may indicate a group identifier that the other terminals may use to join with the master user terminal.

In block 1406, the master user terminal 104 may search for other user terminals 104 to add to the mosaic rendering group. For instance, the master user terminal 104 may periodically communicate a beacon message on a common broadcast channel. The beacon message may include the pairing code. Any user terminal 104 monitoring the common broadcast channel may process and receive the beacon message. The beacon message may be an invitation for the user terminal 104 to join the mosaic rendering group.

In block 1408, the master user terminal 104 may receive an acknowledgment message from a new user terminal 104. The acknowledgment message may indicate whether the user terminal desires to join the mosaic rendering group. In an example embodiment, the acknowledgement message may include the pairing code if the user terminal 104 desires to join the mosaic rendering group.

In block 1410, the master user terminal 104 may authenticate the new user terminal 104 desiring to join the mosaic rendering group. For example, the master user terminal 104 may use group key establishment mechanisms to authenticate the new user terminal 104.

In block 1412, the master user terminal 104 may add the new user terminal to the mosaic rendering group. The master user terminal 104 may, for example, add the new user terminal 104 to the list of user terminals in the mosaic rendering group.

In block 1414, the master user terminal 104 may obtain the capabilities of the new user terminal 104. The capabilities may indicate processing speed, the pixel resolution, or other information about the capabilities of the user terminal 104.

In block 1416, the master user terminal 104 may determine the spatial position of the new user terminal 104 relative to the other user terminals 104 in the mosaic rendering group. Messaging similar to that described above with reference to FIG. 5 may be used. The master user terminal 104 may update the topology of the user terminals 104 included in the mosaic rendering group. The updated topology may also involve reassigning selected subsections of the image 102 and/or the audio assignments.

In block 1418, the master user terminal 104 may communicate the synchronization information, the audio assignment information, and the subsection information to enable the new user terminal 104 to render the mosaic of the media signal. For example, the master user terminal 104 may assign the new user terminal 104 a subsection of an image 102 for display. The method may return to block 1406 to permit the master user terminal 104 to search for other user terminals 104 to add to the mosaic rendering group. Although FIG. 14 describes user terminals being added individually, the master user terminal 104 also may simultaneously or concurrently communicate with one or more user terminals 104 and may attempt to simultaneously or concurrently add multiple user terminals 104 to the mosaic rendering group.

In addition to adding new user terminals 104, the master user terminal 104 may monitor the user terminals 104 of the mosaic rendering group to delete or change rendering assignments based on the availability of the member user terminals 104 to render their assigned subsections of the media stream.

FIG. 15 illustrates a method for monitoring operation of members of the mosaic rendering group to maintaining the list of available devices in accordance with example embodiments of the present disclosure.

In block 1502, the master user terminal 104 may periodically request that each user terminal in a mosaic rendering group send a status message. The status message may indicate the operating status of a user terminal 104. A user terminal 104 also may automatically send a status message if there has been a change. The operating status may indicate the ability of a user terminal 104 to render the media signal in accordance with its assignment. A user terminal 104 may not be able render in accordance with its assignment if it is performing another function. For example, if the user terminal 104 is a mobile phone, the user terminal 104 may not be able to render when a call is received or that its battery is low. Additionally, the user terminal 104 may become unavailable if its operating system or other software crashes.

The status message also may indicate changes in location and/or orientation relative to the other members of the mosaic rendering group. For instance, each user terminal 104 may continuously monitor its location and may communicate this information back to the master user terminal 104 in the status message. The master user terminal 104 also may dynamically detect changes in group topology from the status message including information detected by the MO sensor 320, the position sensors 312, and/or manual (re)configuration based on user input.

In block 1504, the master user terminal 104 may process the status message to determine whether the user terminal 104 is available to continue rendering in accordance with its assignment. The method may continue to block 1506 if the user device 104 is no longer able to continue rendering in accordance with its assignment, and the method may return to block 1502 if the user terminal is available to continue rendering in accordance with its assignment.

In block 1506, the master user terminal 104 may halt the rendering responsibility of the user terminal 104 that can no longer continue rendering in accordance with its assignment. The user terminal 104 may become unavailable, for instance, when a phone call is received.

In block 1508, the master user terminal 104 may compute an updated group topology. The updated group topology may be based on changes in spatial position, unavailable user terminals 104, orientation changes, distance changes, and/or any combination thereof.

In block 1510, the master user terminal 104 may update the rendering responsibility of each of the user terminals 104 of the mosaic rendering group based on the updated group topology and may communicate the updated rendering responsibility to each of the members. For instance, the master user terminal 104 may assign a larger subsection of a media signal having an image 102 to each of the user terminals 104 included in the mosaic rendering group that remain available should one or more of the other user terminals 104 become unavailable. Also, when user terminals 104 change locations relative to one another, the master user terminal 104 may or may not update the topology and/or the subsection rendering assignments. For instance, when a user terminal 104 is removed, the master user terminal 104 may automatically re-adjust the subsection assignments to render the same area of the image 102 as before. Also, the master user terminal 104 may leave holes and allow users to manually adjust subsections displayed by the user terminals 104. The user terminals 104 may receive the updated subsection information to update rendering responsibility, and if there are any changes, a user terminal 104 assigned a different rendering responsibility may flush any audio and/or video buffers corresponding to the previous assignment. The method may continue to block 1502 and may repeat.

The mosaic rendering group also may provide for failure detection of the master user terminal 104 and replacement based on the status message. A user terminal 104 of the mosaic rendering group may detect a failure of the master user terminal 104 if the master user terminal 104 has not requested a status message within a predetermined amount of time. The user terminal 104 first identifying that the master user terminal 104 has not sent a status message within the predetermined amount of time may broadcast a message to the other user terminals 104 of the mosaic rendering group and may assume the role of master. Also, the identifying user terminal 104 may process the capabilities of the user terminals 104 of the mosaic rendering group and may select a new master user terminal 104. Once selected, the identifying user terminal 104 may broadcast the selection to the other user terminals 104 of the mosaic rendering group.

The master user terminal 104 need not actively render the media signal (e.g., audio and/or video). For example, if the mosaic rendering group is rendering video, a keyboard input of the master user terminal 104 may be used as a dedicated device for control so that the viewing experience is not disturbed by a user operating the keyboard in the middle of the screen.

The master user terminal 104 also may be used to control the displayed mosaic of the media signal. For instance, moving the master user terminal 104 (e.g., left or right) may be used to move what portion of an image 104 is displayed as a mosaic. The master user terminal 104 may detect a change in its motion through the MO sensor 320, for example, to change a zoom level to zoom in and/or out the mosaic of the image 102. The user of the master user terminal 104 also may provide input that may cause display of options for actions, such as, but not limited to, stopping, slow motion, reversing, fast forwarding, recording of the media signal, and/or any combination thereof. If a content provider charges for fee for the media signal, the master user terminal 104 may permit the user to purchase the media signal and/or may optionally split the fee in any desired proportion between members of the mosaic rendering group. Additionally, the master user terminal 104 may display a small view of the full image 102 outlining (e.g., colored red) the subsections displayed in the mosaic. The master user terminal 104 also may display per-device status information, an orientation map, and a configuration guide for the users.

The components of the user terminal 104 described above may include one or more modules that may include hardware, software, firmware, and/or any combination thereof. For instance, the processor 304 may include a communication module for communicating with the other user terminals 104, a group topology module for determining a group topology of the mosaic rendering group, a subsection information generation module for generating the subsection information to assign subsections to various user terminals of the mosaic rendering group. The processor 304 also may include other modules for performing the methods steps described herein.

Advantageously, the user terminals 104 may interact without requiring any interaction with a server through local ad-hoc communications. Of course, interacting with servers and/or service providers can also be implemented. The example embodiments can be used in unidirectional broadcast networks, are scalable concerning the number of user terminals 104 in operation a mosaic rendering group at the same point in time, and do not utilize valuable communication capacity. Lastly, if, for example, a DVB-H stream is rendered, cellular network coverage may not be required for the mosaic rendering group as they may locally communicate with one another.

Thus, the example embodiments of the mosaic rendering group may improve fidelity (e.g., by means of stereo or surround sound, larger video screens, individual zooming capabilities). The mosaic rendering group can also provide for automatic configuration of user terminals according to the group topology, joint control of all user terminals from a single master user terminal, the capability of dynamically reconfiguring the mosaic rendering group to add and/or remove user terminals temporarily or permanently, and the capability to use motion sensing for controlling the rendering on individual and/or all user terminals.

The example embodiments of the present disclosure may organize the rendering of media signals across several devices to improve fidelity. The improved fidelity may be through increasing the screen size and/or the screen resolution, and/or the number and distribution of speakers. The enhanced viewing (or, more generally: perception) experience may be applied in support of various mobile media applications, such as, but not limited to, watching mobile TV, watching mobile (on-demand) media streams, or creating a video wall for mobile users.

The foregoing description was provided with respect to coordinating user terminals 104 to render a mosaic of a media signal (e.g., a mosaic of an image 102) and/or a stereo audio experience. It is understood that the principles described herein may be extended to different types of user terminals 104, including those in wired and wireless networks. The features described in association with a particular example embodiment also may be combined with and/or used instead of features described in association with other example embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    receiving, at a computing device, a user terminal identifier, relative distance information, and a sensor identifier from a user terminal;
    determining a group topology based on the user terminal identifier, the relative distance information, and the sensor identifier, wherein the group topology defines a spatial relationship of the user terminal relative to the computing device;
    receiving a media signal;
    identifying a subsection of the media signal;
    assigning, by the computing device, the subsection to the user terminal based on the group topology, resulting in an assignment of the subsection to the user terminal; and
    communicating, to the user terminal, information indicative of the assignment of the subsection to the user terminal.

2. The method of claim 1, further comprising communicating the media signal to the user terminal.

3. The method of claim 1, wherein the information indicative of the assignment includes the subsection of the media signal.

4. The method of claim 1, wherein the media signal is received from a content provider.

5. The method of claim 1, further comprising:
    assigning audio data that is associated with the media signal to the user terminal, resulting in an assignment of the audio data to the user terminal; and
    communicating, to the user terminal, information indicative of the assignment of the audio data to the user terminal.

6. The method of claim 1, further comprising:
    detecting movement of the user terminal; and
    adjusting the subsection according to the movement.

7. The method of claim 6, wherein adjusting the subsection includes changing a zoom level applied to the subsection.

8. The method of claim 6, wherein adjusting the subsection includes modifying media signal data included in the subsection.

9. The method of claim 1, further comprising:
    receiving a plurality of media signals that includes the media signal; and
    selecting the media signal from the plurality of media signals.

10. The method of claim 1, further comprising generating synchronization information that indicates when the user terminal is to render the subsection.

11. The method of claim 10, further comprising rendering a second subsection of the media signal in accordance with the synchronization information.

12. An apparatus comprising:
    a processor; and
    memory storing executable instructions configured to, with the processor, cause the apparatus at least to:
        receive a user terminal identifier, relative distance information, and a sensor identifier from a user terminal;
        determine a group topology based on the user terminal identifier, the relative distance information, and the sensor identifier, wherein the group topology defines a spatial relationship of the user terminal relative to the apparatus;
        receive a media signal;
        identify a subsection of the media signal;
        assign the subsection to the user terminal based on the group topology, resulting in an assignment of the subsection to the user terminal; and
        communicate, to the user terminal, information indicative of the assignment of the subsection to the user terminal.

13. The apparatus of claim 12, further comprising a distance sensor configured to determine a distance to the user terminal.

14. The apparatus of claim 12, wherein the memory further stores executable instructions configured to, with the processor, cause the apparatus to:
    generate synchronization information that indicates when the user terminal is to render the subsection; and
    communicate the synchronization information to the user terminal.

15. The apparatus of claim 14, wherein the memory further stores executable instructions configured to, with the processor, cause the apparatus to render a second subsection of the media signal in accordance with the synchronization information.

16. One or more non-transitory computer readable media storing executable instructions that, when executed, cause an apparatus at least to:
    receive a user terminal identifier, relative distance information, and a sensor identifier from a user terminal;
    determine a group topology based on the user terminal identifier, the relative distance information, and the sensor identifier, wherein the group topology defines a spatial relationship of the user terminal relative to the apparatus;
    receive a media signal;
    identify a subsection of the media signal;
    assign the subsection to the user terminal based on the group topology, resulting in an assignment of the subsection to the user terminal; and
    communicate, to the user terminal, information indicative of the assignment of the subsection to the user terminal.

17. A method comprising:
  determining, at a computing device, relative distance to a user terminal, resulting in relative distance information;
  communicating, to the user terminal, an identifier of the computing device, the relative distance information, and a sensor identifier;
  receiving information indicative of an assignment of a subsection of a media signal to the computing device, wherein said assignment is based on at least the identifier of the computing device, the relative distance information and the sensor identifier;
  receiving at least a subsection of the media signal; and
  rendering the subsection of the media signal.

18. The method of claim 17, further comprising:
  receiving an updated assignment; and
  rendering a different subsection of the media signal in accordance with the updated assignment.

19. The method of claim 18, wherein the updated assignment changes a zoom level applied to the subsection of the media signal.

20. The method of claim 17, wherein the media signal comprises at least one of audio or video.

21. The method of claim 17, wherein receiving at least the subsection of the media signal includes receiving the media signal from a content provider.

22. The method of claim 17, wherein receiving at least the subsection of the media signal includes receiving the media signal from the user terminal.

23. The method of claim 17, further comprising receiving synchronization information that indicates when the computing device is to render the subsection of the media signal, and wherein rendering the subsection of the media signal occurs in accordance with the synchronization information.

24. An apparatus comprising:
  a processor; and
  memory storing executable instructions configured to, with the processor, cause the apparatus at least to:
    determine relative distance to a user terminal, resulting in relative distance information;
    communicate, to the user terminal, an identifier of the apparatus, the relative distance information, and a sensor identifier;
    receive information indicative of an assignment of a subsection of a media signal to the apparatus, wherein said assignment is based on at least the identifier of the apparatus, the relative distance information and the sensor identifier;
    receive at least the subsection of the media signal; and
    render the subsection of the media signal.

25. The apparatus of claim 24, wherein the memory further stores executable instructions configured to, with the processor, cause the apparatus to:
  receive an updated assignment; and
  render a different subsection of the media signal in accordance with the updated assignment.

26. The apparatus of claim 24, wherein the memory further stores executable instructions configured to, with the processor, cause the apparatus to receive synchronization information that indicates when the apparatus is to render the subsection of the media signal, and wherein rendering the subsection of the media signal occurs in accordance with the synchronization information.

27. One or more non-transitory computer readable media storing executable instructions that, when executed, cause an apparatus at least to:
  determine relative distance to a user terminal, resulting in relative distance information;
  communicate, to the user terminal, an identifier of the apparatus, the relative distance information, and a sensor identifier;
  receive information indicative of an assignment of a subsection of a media signal to the apparatus, wherein said assignment is based on at least the identifier of the apparatus, the relative distance information and the sensor identifier;
  receive at least the subsection of the media signal; and
  render the subsection of the media signal.

28. The method of claim 17, wherein determining the relative distance to a user terminal includes comparing a measurement from a sensor of the computing device with one or more reference values stored by the computing device, wherein each of the one or more references values corresponds with a particular distance.

* * * * *